(12) United States Patent
Cier et al.

(10) Patent No.: US 11,405,549 B2
(45) Date of Patent: Aug. 2, 2022

(54) AUTOMATED GENERATION ON MOBILE DEVICES OF PANORAMA IMAGES FOR BUILDING LOCATIONS AND SUBSEQUENT USE

(71) Applicant: Zillow, Inc., Seattle, WA (US)

(72) Inventors: Sean P. Cier, Ravensdale, WA (US); Sing Bing Kang, Redmond, WA (US); Mitchell David Dawson, Redmond, WA (US)

(73) Assignee: Zillow, Inc., Seattle, WA (US)

( * ) Notice: Subject to any disclaimer, the term of this patent is extended or adjusted under 35 U.S.C. 154(b) by 0 days.

(21) Appl. No.: 17/243,146

(22) Filed: Apr. 28, 2021

(65) Prior Publication Data

US 2021/0385378 A1 Dec. 9, 2021

Related U.S. Application Data

(60) Provisional application No. 63/035,619, filed on Jun. 5, 2020.

(51) Int. Cl.
*H04N 5/232* (2006.01)
*H04N 5/91* (2006.01)
(Continued)

(52) U.S. Cl.
CPC .......... *H04N 5/23238* (2013.01); *G06T 1/60* (2013.01); *G06T 3/4038* (2013.01); *G06T 5/002* (2013.01);
(Continued)

(58) Field of Classification Search
None
See application file for complete search history.

(56) References Cited

U.S. PATENT DOCUMENTS 5,140,352 A   8/1992   Moore et al.
6,031,540 A   2/2000   Golin et al.
(Continued)

FOREIGN PATENT DOCUMENTS

EP   2413097 A2   2/2012
EP   2505961 A2   10/2012
(Continued)

OTHER PUBLICATIONS

CubiCasa | From video to floor plan in under 5 minutes, retrieved on Mar. 26, 2019, from https://www.cubi.casa/, 6 pages.
(Continued)

*Primary Examiner* — Eileen M Adams
(74) *Attorney, Agent, or Firm* — VLP Law Group LLP; James A. D. White

(57) ABSTRACT

Techniques are described for using a smart phone or other mobile device to perform automated operations for generating panorama images of building environments and for subsequently using the generated panorama images in further automated manners. In at least some situations, the generation of a panorama image by a mobile device is based at least in part on automatically acquiring multiple constituent images on the mobile device in multiple directions from an acquisition location and on concurrently combining acquired constituent images on the mobile device, such as in a real-time manner relative to the constituent image capture, to generate a panorama image with 360° of horizontal coverage of the view from that acquisition location. Information about such identified building floor plans may be used in various automated manners, including for controlling navigation of devices (e.g., autonomous vehicles), for display on client devices in corresponding graphical user interfaces, etc.

25 Claims, 18 Drawing Sheets

(51) Int. Cl.
    *H04N 5/265*     (2006.01)
    *G06T 7/33*     (2017.01)
    *G06T 3/40*     (2006.01)
    *G06T 5/00*     (2006.01)
    *G06T 5/50*     (2006.01)
    *H04N 5/262*     (2006.01)
    *G06T 7/38*     (2017.01)
    *G06T 1/60*     (2006.01)

(52) U.S. Cl.
    CPC .................. *G06T 5/50* (2013.01); *G06T 7/33* (2017.01); *G06T 7/38* (2017.01); *H04N 5/23229* (2013.01); *H04N 5/265* (2013.01); *H04N 5/2622* (2013.01); *H04N 5/91* (2013.01); *G06T 2207/10016* (2013.01); *G06T 2207/20132* (2013.01); *G06T 2207/20212* (2013.01); *G06T 2207/30168* (2013.01)

(56) References Cited

U.S. PATENT DOCUMENTS

| | | | |
|---|---|---|---|
| 6,141,034 A | 10/2000 | McCutchen |
| 6,317,166 B1 | 11/2001 | McCutchen |
| 6,320,584 B1 | 11/2001 | Golin et al. |
| 6,323,858 B1 | 11/2001 | Gilbert et al. |
| 6,337,683 B1 | 1/2002 | Gilbert et al. |
| 6,654,019 B2 | 11/2003 | Gilbert et al. |
| 6,683,608 B2 | 1/2004 | Golin et al. |
| 6,690,374 B2 | 2/2004 | Park et al. |
| 6,731,305 B1 | 5/2004 | Park et al. |
| 6,738,073 B2 | 5/2004 | Park et al. |
| 7,050,085 B1 | 5/2006 | Park et al. |
| 7,129,971 B2 | 10/2006 | McCutchen |
| 7,196,722 B2 | 3/2007 | White et al. |
| 7,525,567 B2 | 4/2009 | McCutchen |
| 7,620,909 B2 | 11/2009 | Park et al. |
| 7,627,235 B2 | 12/2009 | McCutchen et al. |
| 7,782,319 B2 | 8/2010 | Ghosh et al. |
| 7,791,638 B2 | 9/2010 | McCutchen |
| 7,909,241 B2 | 3/2011 | Stone et al. |
| 7,973,838 B2 | 7/2011 | McCutchen |
| 8,072,455 B2 | 12/2011 | Temesvar et al. |
| 8,094,182 B2 | 1/2012 | Park et al. |
| RE43,786 E | 11/2012 | Cooper |
| 8,463,020 B1 | 6/2013 | Schuckmann et al. |
| 8,517,256 B2 | 8/2013 | Stone et al. |
| 8,520,060 B2 | 8/2013 | Zomet et al. |
| 8,523,066 B2 | 9/2013 | Stone et al. |
| 8,523,067 B2 | 9/2013 | Stone et al. |
| 8,528,816 B2 | 9/2013 | Stone et al. |
| 8,540,153 B2 | 9/2013 | Stone et al. |
| 8,594,428 B2 | 11/2013 | Aharoni et al. |
| 8,654,180 B2 | 2/2014 | Zomet et al. |
| 8,666,815 B1 | 3/2014 | Chau |
| 8,699,005 B2 | 4/2014 | Likholyot |
| 8,705,892 B2 | 4/2014 | Aguilera et al. |
| RE44,924 E | 6/2014 | Cooper et al. |
| 8,854,684 B2 | 10/2014 | Zomet |
| 8,861,840 B2 | 10/2014 | Bell et al. |
| 8,861,841 B2 | 10/2014 | Bell et al. |
| 8,879,828 B2 | 11/2014 | Bell et al. |
| 8,953,871 B2 | 2/2015 | Zomet |
| 8,989,440 B2 | 3/2015 | Klusza et al. |
| 8,996,336 B2 | 3/2015 | Malka et al. |
| 9,021,947 B2 | 5/2015 | Landa |
| 9,026,947 B2 | 5/2015 | Lee et al. |
| 9,035,968 B2 | 5/2015 | Zomet |
| 9,041,796 B2 | 5/2015 | Malka et al. |
| 9,071,714 B2 | 6/2015 | Zomet |
| 9,129,438 B2 | 9/2015 | Aarts et al. |
| 9,151,608 B2 | 10/2015 | Malka et al. |
| 9,165,410 B1 | 10/2015 | Bell et al. |
| 9,171,405 B1 | 10/2015 | Bell et al. |
| 9,324,190 B2 | 4/2016 | Bell et al. |
| 9,361,717 B2 | 6/2016 | Zomet |
| 9,396,586 B2 | 7/2016 | Bell et al. |
| 9,438,759 B2 | 9/2016 | Zomet |
| 9,438,775 B2 | 9/2016 | Powers et al. |
| 9,489,775 B1 | 11/2016 | Bell et al. |
| 9,495,783 B1 | 11/2016 | Samarasekera et al. |
| 9,576,401 B2 | 2/2017 | Zomet |
| 9,619,933 B2 | 4/2017 | Spinella-Marno et al. |
| 9,635,252 B2 | 4/2017 | Accardo et al. |
| 9,641,702 B2 | 5/2017 | Bin-Nun et al. |
| 9,760,994 B1 | 9/2017 | Bell et al. |
| 9,786,097 B2 | 10/2017 | Bell et al. |
| 9,787,904 B2 | 10/2017 | Bidder et al. |
| 9,836,885 B1 | 12/2017 | Eraker et al. |
| 9,852,351 B2 | 12/2017 | Aguilera Perez et al. |
| 9,953,111 B2 | 4/2018 | Bell et al. |
| 9,953,430 B1 | 4/2018 | Zakhor |
| 9,990,760 B2 | 6/2018 | Aguilera Perez et al. |
| 9,990,767 B1 | 6/2018 | Sheffield et al. |
| 10,026,224 B2 | 7/2018 | Bell et al. |
| 10,030,979 B2 | 7/2018 | Bjorke et al. |
| 10,055,876 B2 | 8/2018 | Ford et al. |
| 10,068,344 B2 | 9/2018 | Jovanovic et al. |
| 10,083,522 B2 | 9/2018 | Jovanovic et al. |
| 10,102,639 B2 | 10/2018 | Bell et al. |
| 10,102,673 B2 | 10/2018 | Eraker et al. |
| 10,120,397 B1 | 11/2018 | Zakhor et al. |
| 10,122,997 B1 | 11/2018 | Sheffield et al. |
| 10,127,718 B2 | 11/2018 | Zakhor et al. |
| 10,127,722 B2 | 11/2018 | Shakib et al. |
| 10,139,985 B2 | 11/2018 | Mildrew et al. |
| 10,163,261 B2 | 12/2018 | Bell et al. |
| 10,163,271 B1 | 12/2018 | Powers et al. |
| 10,181,215 B2 | 1/2019 | Sedeffow |
| 10,192,115 B1 | 1/2019 | Sheffield et al. |
| 10,204,185 B2 | 2/2019 | Mrowca et al. |
| 10,210,285 B2 | 2/2019 | Wong et al. |
| 10,235,797 B1 | 3/2019 | Sheffield et al. |
| 10,242,400 B1 | 3/2019 | Eraker et al. |
| 10,339,716 B1 | 7/2019 | Powers et al. |
| 10,366,531 B2 | 7/2019 | Sheffield |
| 10,395,435 B2 | 8/2019 | Powers et al. |
| 2006/0256109 A1 | 11/2006 | Acker et al. |
| 2007/0081081 A1 | 4/2007 | Cheng |
| 2010/0232709 A1 | 9/2010 | Zhang et al. |
| 2012/0075414 A1 | 3/2012 | Park et al. |
| 2012/0293613 A1 | 11/2012 | Powers et al. |
| 2013/0050407 A1 | 2/2013 | Brinda et al. |
| 2013/0342533 A1 | 12/2013 | Bell et al. |
| 2014/0043436 A1 | 2/2014 | Bell et al. |
| 2014/0044343 A1 | 2/2014 | Bell et al. |
| 2014/0044344 A1 | 2/2014 | Bell et al. |
| 2014/0125658 A1 | 5/2014 | Bell et al. |
| 2014/0125767 A1 | 5/2014 | Bell et al. |
| 2014/0125768 A1 | 5/2014 | Bell et al. |
| 2014/0125769 A1 | 5/2014 | Bell et al. |
| 2014/0125770 A1 | 5/2014 | Bell et al. |
| 2014/0236482 A1 | 8/2014 | Dorum et al. |
| 2014/0267631 A1 | 9/2014 | Powers et al. |
| 2014/0307100 A1 | 10/2014 | Myllykoski et al. |
| 2014/0320674 A1 | 10/2014 | Kuang |
| 2014/0362108 A1 | 12/2014 | Aguera-Arcas |
| 2015/0116691 A1 | 4/2015 | Likholyot |
| 2015/0189165 A1 | 7/2015 | Milosevski et al. |
| 2015/0262421 A1 | 9/2015 | Bell et al. |
| 2015/0269785 A1 | 9/2015 | Bell et al. |
| 2015/0302636 A1 | 10/2015 | Arnoldus et al. |
| 2015/0310596 A1 | 10/2015 | Sheridan et al. |
| 2015/0332464 A1 | 11/2015 | O'Keefe et al. |
| 2016/0055268 A1 | 2/2016 | Bell et al. |
| 2016/0134860 A1 | 5/2016 | Jovanovic et al. |
| 2016/0140676 A1 | 5/2016 | Fritze et al. |
| 2016/0217225 A1 | 7/2016 | Bell et al. |
| 2016/0260250 A1 | 9/2016 | Jovanovic et al. |
| 2016/0286119 A1 | 9/2016 | Rondinelli |
| 2016/0300385 A1 | 10/2016 | Bell et al. |
| 2017/0034430 A1 | 2/2017 | Fu et al. |
| 2017/0067739 A1 | 3/2017 | Siercks et al. |
| 2017/0194768 A1 | 7/2017 | Powers et al. |

(56) References Cited

U.S. PATENT DOCUMENTS

| | | | |
|---|---|---|---|
| 2017/0195654 A1 | 7/2017 | Powers et al. | |
| 2017/0263050 A1 | 9/2017 | Ha et al. | |
| 2017/0324941 A1 | 11/2017 | Birkler | |
| 2017/0330273 A1 | 11/2017 | Holt et al. | |
| 2017/0337737 A1 | 11/2017 | Edwards et al. | |
| 2018/0007340 A1 | 1/2018 | Stachowski | |
| 2018/0025536 A1 | 1/2018 | Bell et al. | |
| 2018/0075168 A1 | 3/2018 | Tiwari et al. | |
| 2018/0096527 A1* | 4/2018 | Eraker | G06T 17/00 |
| 2018/0139431 A1 | 5/2018 | Simek et al. | |
| 2018/0143023 A1 | 5/2018 | Bjorke et al. | |
| 2018/0143756 A1 | 5/2018 | Mildrew et al. | |
| 2018/0144487 A1 | 5/2018 | Bell et al. | |
| 2018/0144535 A1 | 5/2018 | Ford et al. | |
| 2018/0144547 A1 | 5/2018 | Shakib et al. | |
| 2018/0144555 A1 | 5/2018 | Ford et al. | |
| 2018/0146121 A1 | 5/2018 | Hensler et al. | |
| 2018/0146193 A1 | 5/2018 | Safreed et al. | |
| 2018/0146212 A1 | 5/2018 | Hensler et al. | |
| 2018/0165871 A1 | 6/2018 | Mrowca | |
| 2018/0189565 A1* | 7/2018 | Lukierski | G06T 7/74 |
| 2018/0203955 A1 | 7/2018 | Bell et al. | |
| 2018/0241985 A1 | 8/2018 | O'Keefe et al. | |
| 2018/0293793 A1 | 10/2018 | Bell et al. | |
| 2018/0300936 A1 | 10/2018 | Ford et al. | |
| 2018/0306588 A1 | 10/2018 | Bjorke et al. | |
| 2018/0344291 A1* | 12/2018 | Martins | A61B 8/445 |
| 2018/0348854 A1 | 12/2018 | Powers et al. | |
| 2018/0365496 A1 | 12/2018 | Hovden et al. | |
| 2019/0012833 A1 | 1/2019 | Eraker et al. | |
| 2019/0026956 A1 | 1/2019 | Gausebeck et al. | |
| 2019/0026957 A1 | 1/2019 | Gausebeck | |
| 2019/0026958 A1 | 1/2019 | Gausebeck et al. | |
| 2019/0035165 A1 | 1/2019 | Gausebeck | |
| 2019/0041972 A1 | 2/2019 | Bae | |
| 2019/0050137 A1 | 2/2019 | Mildrew et al. | |
| 2019/0051050 A1 | 2/2019 | Bell et al. | |
| 2019/0051054 A1 | 2/2019 | Jovanovic et al. | |
| 2019/0087067 A1 | 3/2019 | Hovden et al. | |
| 2019/0122422 A1 | 4/2019 | Sheffield et al. | |
| 2019/0164335 A1 | 5/2019 | Sheffield et al. | |
| 2019/0180104 A1 | 6/2019 | Sheffield et al. | |
| 2019/0251645 A1 | 8/2019 | Winans | |
| 2019/0287164 A1 | 9/2019 | Eraker et al. | |
| 2019/0318538 A1 | 10/2019 | Li et al. | |
| 2020/0116493 A1 | 4/2020 | Colburn et al. | |
| 2021/0073449 A1* | 3/2021 | Segev | G06N 5/025 |

FOREIGN PATENT DOCUMENTS

| | | |
|---|---|---|
| EP | 2506170 A2 | 10/2012 |
| KR | 1 01770648 B1 | 8/2017 |
| KR | 1 01930796 B1 | 12/2018 |
| WO | 2005091894 A2 | 10/2005 |
| WO | 2016154306 A1 | 9/2016 |
| WO | 2018204279 A1 | 11/2018 |
| WO | 2019083832 A1 | 5/2019 |
| WO | 2019104049 A1 | 5/2019 |
| WO | 2019118599 A2 | 6/2019 |

OTHER PUBLICATIONS

CubiCasa FAQ & Manual, retrieved on Mar. 26, 2019, from https://www.cubi.casa/faq/, 5 pages.

Cupix Home, retrieved on Mar. 26, 2019, from https://www.cupix.com/, 1 page.

Cupix—FAQ, retrieved on Mar. 26, 2019, from https://www.cupix.com/faq.html, 3 pages.

Guide: 3D Virtual Tours, retrieved on Mar. 26, 2019, from https://goiguide.com/, 6 pages.

immoviewer.com | Automated Video Creation & Simple Affordable 3D 360 Tours, retrieved on Mar. 26, 2019, from https://www.immoviewer.com/, 5 pages.

MagicPlan | #1 Floor Plan App, Construction & Surveying Samples, retrieved on Mar. 26, 2019, from https://www.magicplan.app/, 9 pages.

EyeSpy360 Virtual Tours | Virtual Tour with any 360 camera, retrieved on Mar. 27, 2019, from https://www.eyespy360.com/en-us/, 15 pages.

Indoor Reality, retrieved on Mar. 27, 2019, from https://www.indoorreality.com/, 9 pages.

InsideMaps, retrieved on Mar. 27, 2019, from https://www.insidemaps.com/, 7 pages.

IStaging | Augmented & Virtual Reality Platform For Business, retrieved on Mar. 27, 2019, from https://www.istaging.com/en/, 7 pages.

Metareal, retrieved on Mar. 27, 2019, from https://www.metareal.com/, 4 pages.

PLNAR—The AR 3D Measuring / Modeling Platform, retrieved on Mar. 27, 2019, from https://www.plnar.co, 6 pages.

YouVR Global, retrieved on Mar. 27, 2019, from https://global.youvr.io/, 9 pages.

GeoCV, retrieved on Mar. 28, 2019, from https://geocv.com/, 4 pages.

Biersdorfer, J.D., "How To Make A 3-D Model Of Your Home Renovation Vision," in The New York Times, Feb. 13, 2019, retrieved Mar. 28, 2019, 6 pages.

Chen et al. "Rise of the indoor crowd: Reconstruction of building interior view via mobile crowdsourcing." In Proceedings of the 13th ACM Conference on Embedded Networked Sensor Systems. Nov. 4, 2015, 13 pages.

Immersive 3D for the Real World, retrieved from https://matterport.com/, on Mar. 27, 2017, 5 pages.

Learn About Our Complete 3D System, retrieved from https://matterport.com/how-it-works/, on Mar. 27, 2017, 6 pages.

Surefield FAQ, retrieved from https://surefield.com/faq, on Mar. 27, 2017, 1 page.

Why Surefield, retrieved from https://surefield.com/why-surefield, on Mar. 27, 2017, 7 pages.

Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.

Tango (platform), Wikipedia, retrieved from https://en.wikipedia.org/wiki/Tango_(platform), on Jun. 12, 2018, 5 pages.

Zou et al. "LayoutNet: Reconstructing the 3D Room Layout from a Single RGB Image" in arXiv:1803.08999, submitted Mar. 23, 2018, 9 pages.

Lee et al. "RoomNet: End-to-End Room Layout Estimation" in arXiv:1703.00241v2, submitted Aug. 7, 2017, 10 pages.

Time-of-flight camera, Wikipedia, retrieved from https://en.wikipedia.org/wiki/Time-of-flight_camera, on Aug. 30, 2018, 8 pages.

Magicplan—Android Apps on Go . . . , retrieved from https://play.google.com/store/apps/details?id=com.sensopia.magicplan, on Feb. 21, 2018, 5 pages.

Arth et al. "Real-Time Self-Localization from Panoramic Images on Mobile Devices" in IEEE International Symposium On Mixed And Augmented Reality 2011 Science and Technology Proceedings, Oct. 2011, 10 pages.

* cited by examiner

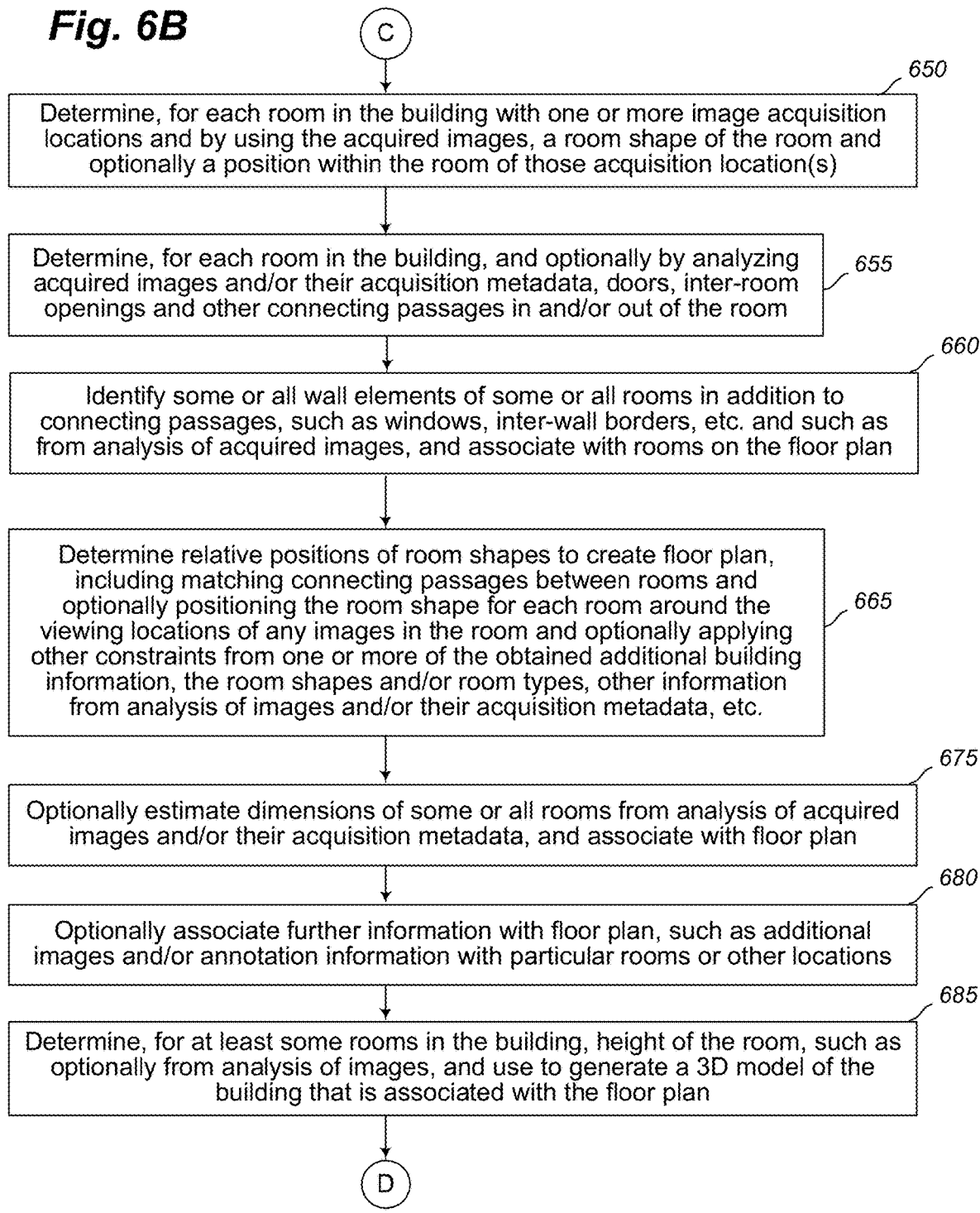

AUTOMATED GENERATION ON MOBILE DEVICES OF PANORAMA IMAGES FOR BUILDING LOCATIONS AND SUBSEQUENT USE

CROSS REFERENCE TO RELATED APPLICATIONS

This application claims the benefit of U.S. Provisional Patent Application No. 63/035,619, filed Jun. 5, 2020 and entitled "Automated Generation On Mobile Devices Of Panorama Images For Buildings Locations And Subsequent Use," which is hereby incorporated by reference in its entirety.

TECHNICAL FIELD

The following disclosure relates generally to techniques for automatically generating panorama images of building environments on mobile devices and for subsequently using the generated panorama images in one or more automated manners, such as to automatically acquire constituent perspective images on a mobile device in multiple directions from an acquisition location in a building interior and to combine acquired constituent images on the mobile device in a real-time manner to generate a panorama image with 360° of horizontal coverage of the view from that acquisition location.

BACKGROUND

In various fields and circumstances, such as architectural analysis, property inspection, real estate acquisition and development, general contracting, improvement cost estimation, etc., it may be desirable to know the interior of a house, office, or other building without having to physically travel to and enter the building. However, it can be difficult to effectively capture, represent and use such building interior information, including to capture visual information within building interiors in an efficient manner, and to display visual information captured within building interiors to users at remote locations (e.g., to enable a user to fully understand the layout and other details of the interior, including to control the display in a user-selected manner). For example, while a panorama image can display information visible from a single location, it can be difficult to capture such panorama images in an efficient manner and to use them to display a multi-room building or other large space. In addition, while a floor plan of a building may provide some information about layout and other details of a building interior, such use of floor plans has some drawbacks, including that floor plans can be difficult to construct and maintain, to accurately scale and populate with information about room interiors, to visualize and otherwise use, etc.

BRIEF DESCRIPTION OF THE DRAWINGS

FIGS. 6A-6B illustrate an example embodiment of a flow diagram for a Mapping Information Generation Manager (MIGM) system routine in accordance with an embodiment of the present disclosure.

DETAILED DESCRIPTION

Figure 1A:
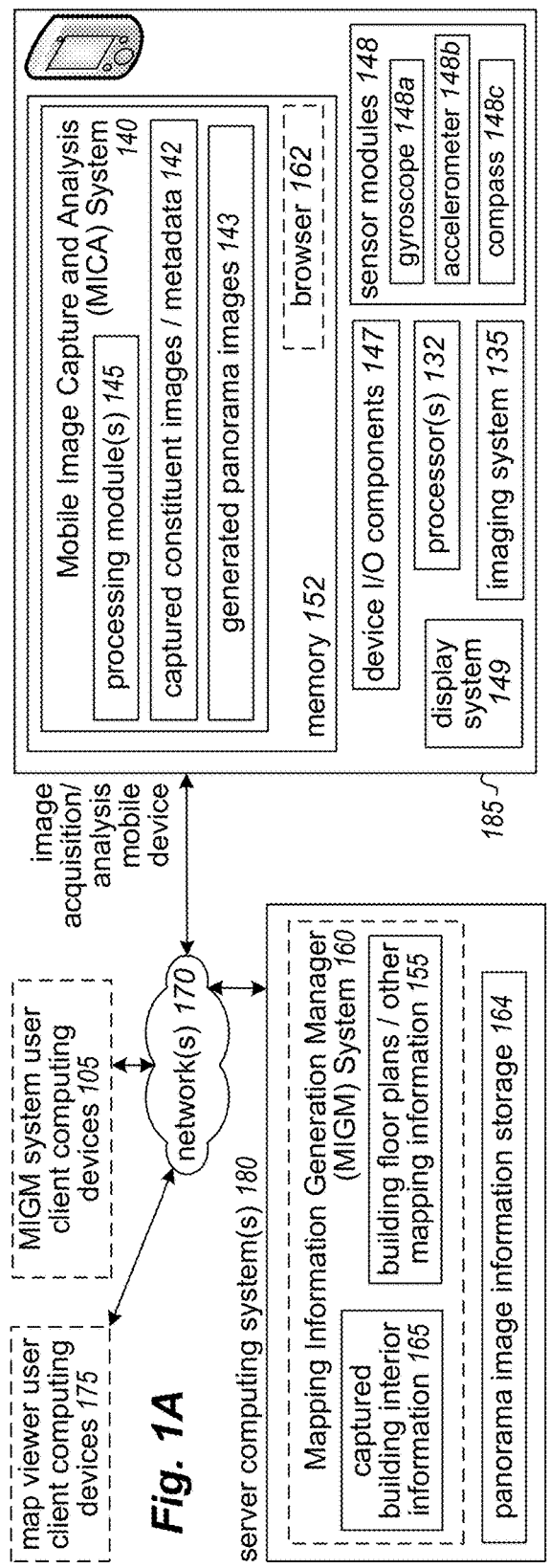
FIGS. 1A-1B are diagrams depicting an exemplary building interior environment and computing system(s) for use in embodiments of the present disclosure, including to automatically generate panorama images on a mobile device for multiple acquisition locations in the building interior using constituent perspective images acquired by the mobile device in multiple directions from each of the acquisition locations, and to optionally further present or otherwise use the generated building interior panorama images.

The present disclosure describes techniques for using a smart phone or other mobile device (e.g., a tablet computing system) to perform automated operations for generating panorama images of building environments by combining constituent images captured by the mobile device, and for subsequently using the generated panorama images in one or more further automated manners. In at least some embodiments, such generation of a panorama image by a mobile device is based at least in part on automatically acquiring multiple constituent images (e.g., rectilinear perspective images) on the mobile device in multiple directions from an acquisition location and on concurrently combining acquired constituent images on the mobile device, in a real-time manner or near-real-time manner relative to the constituent image capture, to generate a panorama image with 360° of horizontal coverage of the view from that acquisition location—such an acquisition location may, in at least some embodiments, be from an environment of an as-built multi-room building (e.g., a house, office building, etc.), such as one of a plurality of acquisition locations within or near the building at each of which such a panorama image is generated (e.g., without having or using information from any depth sensors or other distance-measuring devices about distances from an acquisition location to walls or other objects in the surrounding building). Information about such generated panorama images may be further used in various manners, including in some embodiments to generate a corresponding building floor plan that is used for controlling navigation of mobile devices (e.g., autonomous vehicles), for display or other presentation on one or more client devices in corresponding GUIs (graphical user interfaces), etc. Additional details are included below regarding the automated generation of a panorama image on a mobile device by combining multiple constituent images captured by the mobile device, and some or all of the techniques described herein may, in at least some embodiments, be performed via automated operations of a Mobile Image Capture and Analysis ("MICA") system, as discussed further below.

As noted above, automated operations of a MICA system may include generating a panorama image on a mobile device by combining multiple constituent images captured by the mobile device. In some embodiments, such automated operations including creating a panorama image with 360° of horizontal coverage around a vertical axis, hereinafter referred to at times as a '360° panorama image', by recording data from the mobile device camera(s) and other sensors, and assembling this data into a panorama on the mobile device, followed by uploading the generated panorama image and optionally additional associated information to a remote server. To manage computing resource constraints of the mobile device, such as an amount of available RAM (random access memory) and computational power (e.g., based at least in part on processor speed), some embodiments use a processing pipeline architecture for performing corresponding automated operations on the mobile device, in which various operations may be performed concurrently and asynchronously and at multiple priority levels, such as to generate a panorama image for an acquisition location in a real-time or near-real-time manner upon completion of acquisition of the constituent images that are combined during the panorama image generation. The automated operations on the mobile device may include some or all of the following:

capture a sequence of constituent images from a built-in camera of the mobile device as the mobile device is rotated in a 360° horizontal circle at an acquisition location, such as at least 540 constituent images during the 360° rotation (i.e., one or more constituent images for each of 540 angular slots corresponding to each ~0.67° of rotation);

concurrently and asynchronously with the constituent image capture, select a constituent image for each of the 540 angular slots;

concurrently and asynchronously with the constituent image capture, dynamically crop the selected constituent images to discard unneeded data, such as to retain a central 20% horizontal image strip (and 100% of the vertical information for that strip) for most selected constituent images, while retaining all of the first and last selected constituent images, and in some embodiments dynamically retaining a horizontal strip that is wider than the central 20% for certain constituent images that correspond to one or more exception criteria;

asynchronously with the constituent image capture, compress data in memory for the cropped constituent images, optionally decompress particular compressed data (e.g., for particular constituent images) on-demand as needed, optionally cache decompressed data for further use, and write some or all of the compressed data to long-term storage (e.g., non-volatile storage on the mobile device, storage on a remote device, etc.);

concurrently and asynchronously with the constituent image capture, and also concurrently and asynchronously with the data compression and long-term storage and optional decompression and caching, register the cropped constituent images in a first stitching pass by aligning each of the cropped constituent image slices with the previous constituent image (e.g., by using a translational motion model) and by aligning the last selected constituent image with the previous constituent image in a similar manner, while performing additional image analysis activities in a subsequent final stitching pass; and after the constituent image capture is completed, and concurrently and asynchronously with the data compression and long-term storage and optional decompression and caching, complete the panorama image generation in a final stitching pass by aligning the first and last selected constituent images (e.g., by using optical flow alignment, to complete the 360° loop for the panorama image), computing drift error between the aligned first and last selected constituent images and distributing the drift error across all of the selected constituent images, smoothing exposure between adjacent selected constituent images to reduce differences in intensity, smoothing spatial overlaps between adjacent selected constituent images by blending or feathering those adjacent images, and cropping the combined selected constituent images using a bounding box that excludes any uncovered regions.

Each of the automated operations may be performed in particular manners in particular embodiments, and additional details are included below regarding such automated operations, including with respect to the examples of FIGS. 2A-2H and 2J-2K and their associated description. In addition, in at least some embodiments, the generated panorama images may differ in one or more manners than those described above—as one specific example, a generated panorama image may have less than 360° of horizontal coverage (e.g., 200°, 250°, 300°, 350°, etc.)—if so at least some of the operations for the final stitching pass may not be performed in such embodiments (e.g., loop closure of first and last constituent images, and optionally associated error drift calculation and distribution), and in some such embodiments any remaining operations of the final stitching pass (e.g., smoothing of exposure and/or spatial overlaps, tracking of boundaries of bounding box for final cropping, etc.) may be performed as part of the first stitching pass and concurrently with the capture of the constituent images.

Figure 2A:
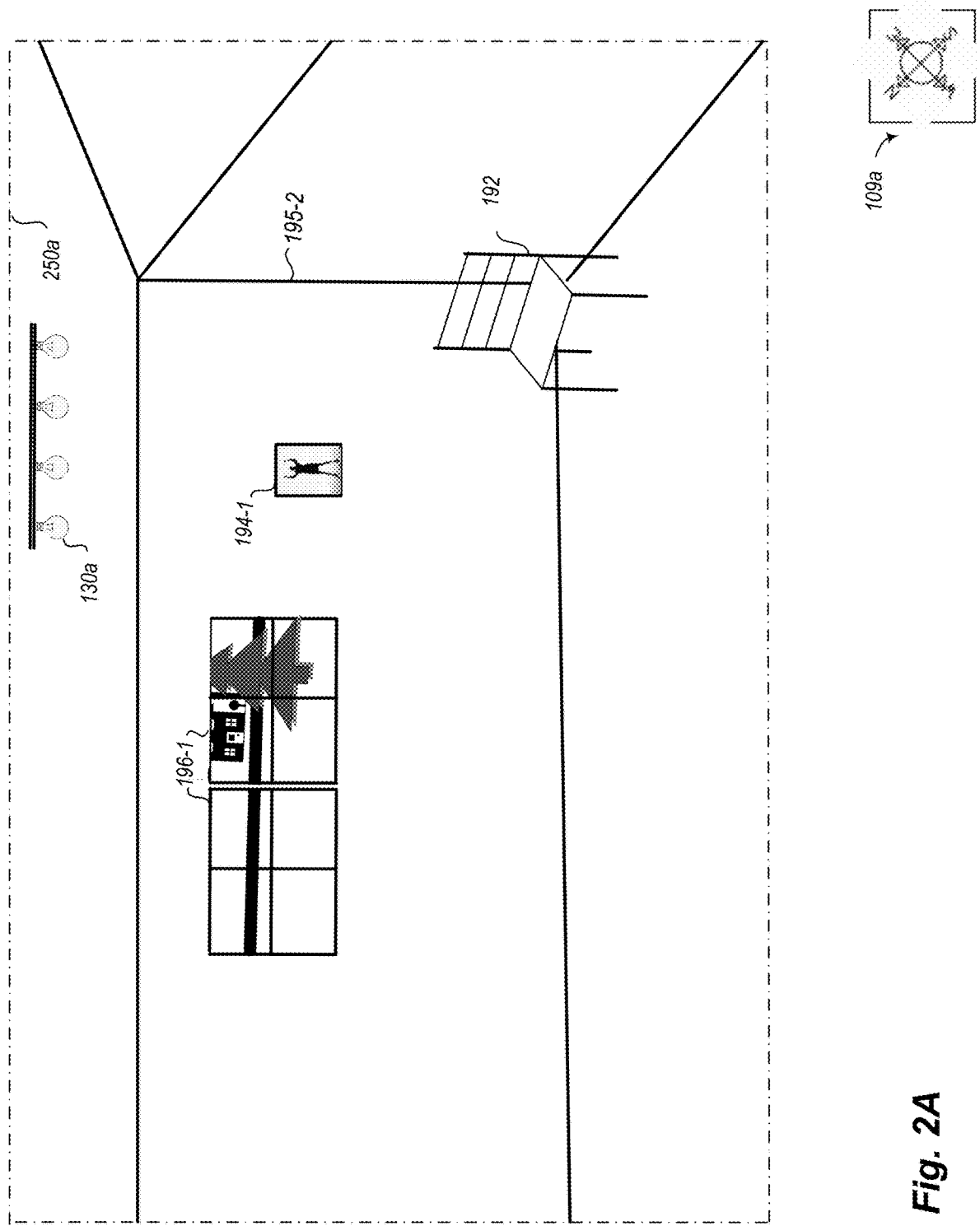
FIGS. 2A-2K illustrate examples of automatically generating a 360° panorama image on a mobile device for an acquisition location in a building interior by combining multiple constituent perspective images acquired by the mobile device in multiple directions from the acquisition location, and for subsequently using the generated panorama image in one or more automated manners.
Figure 2B:
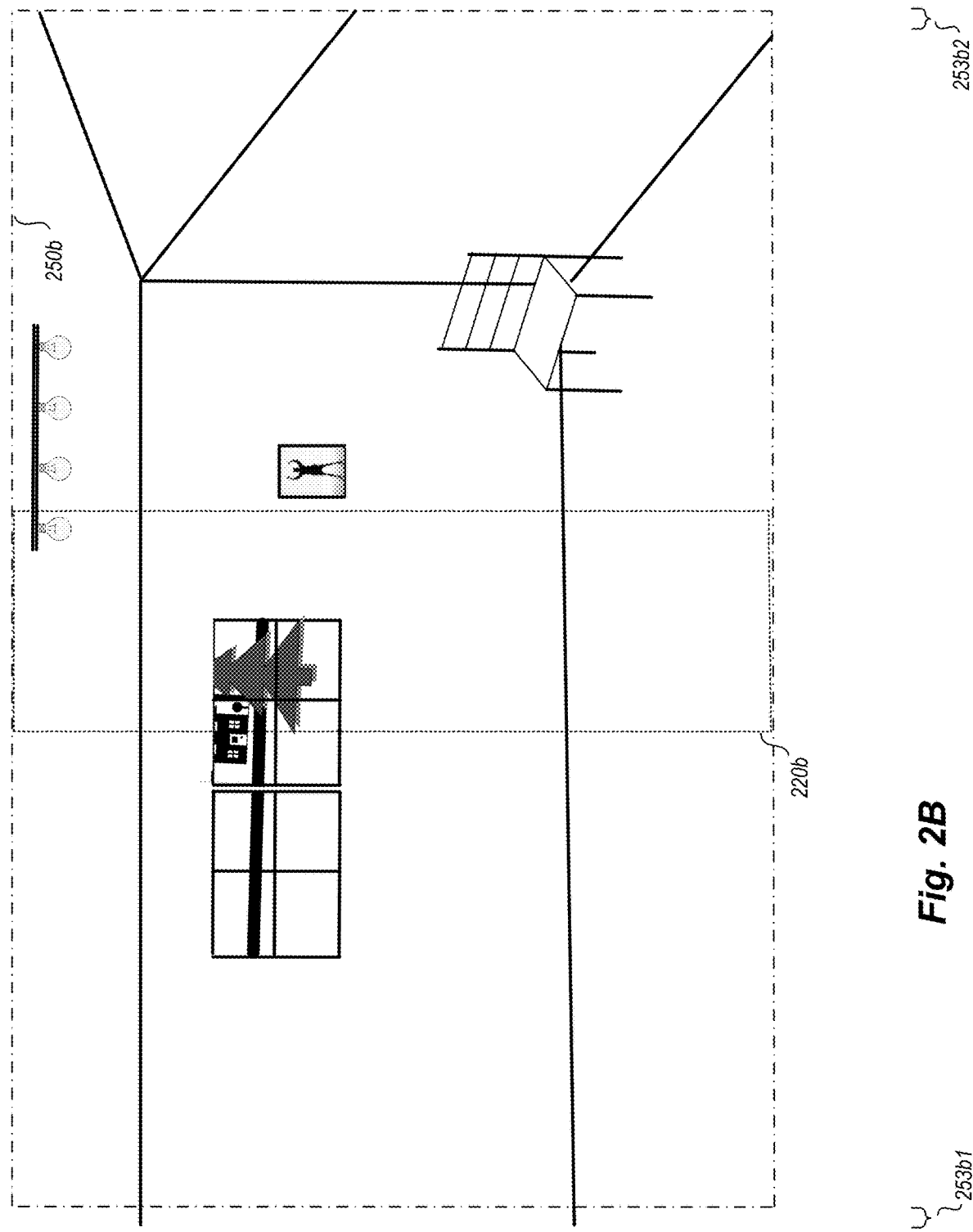
Figure 2C:
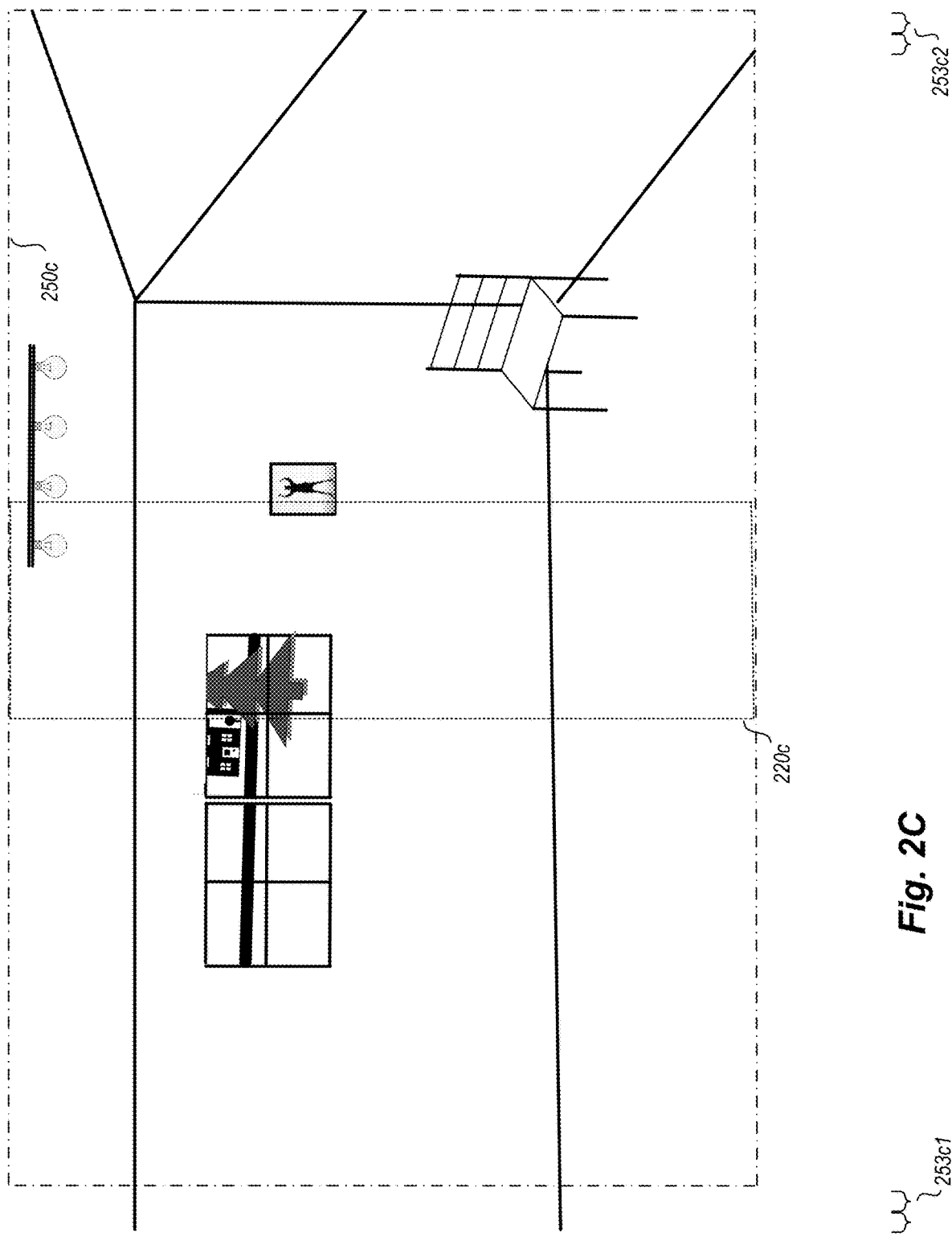
Figure 2D:
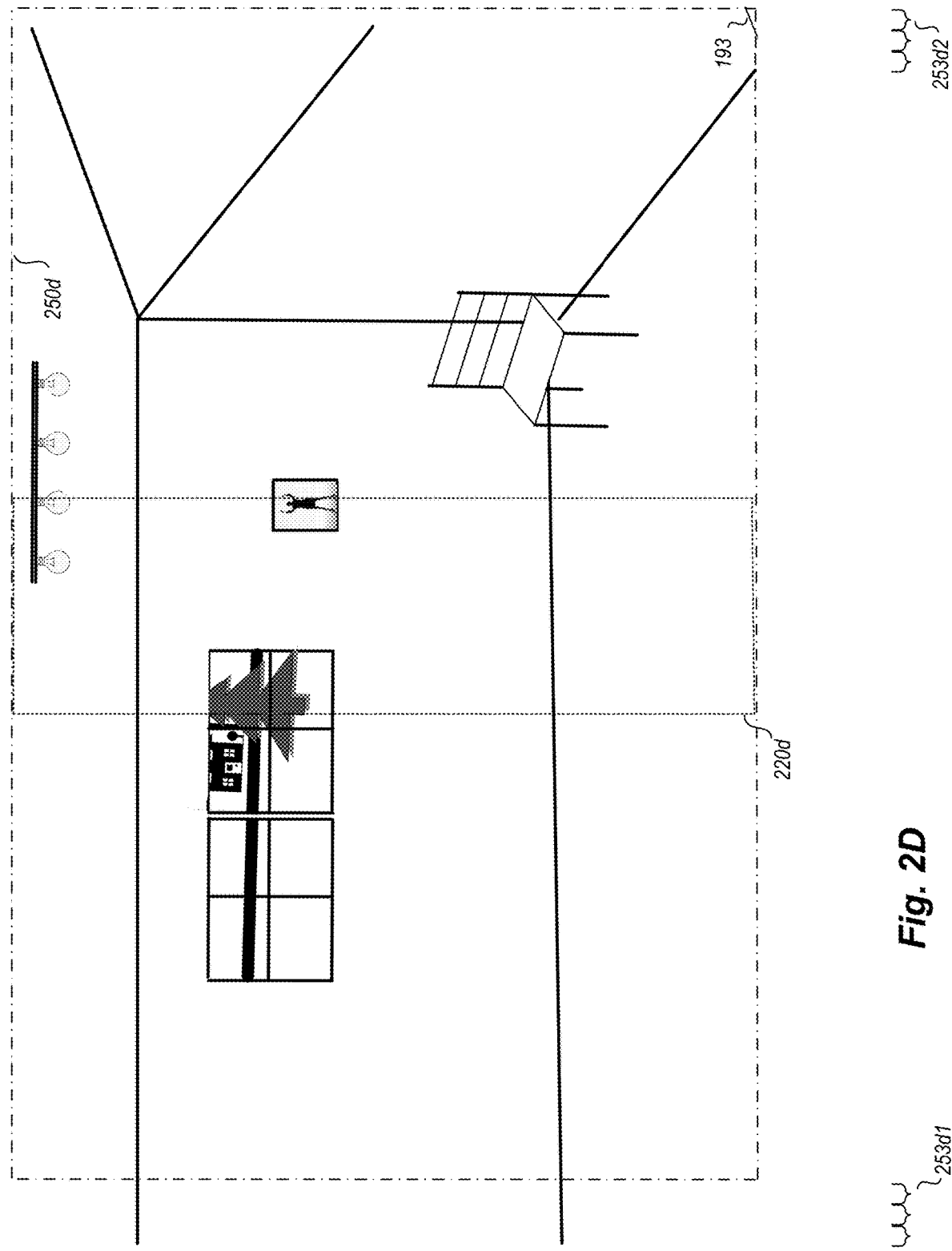
Figure 2E:
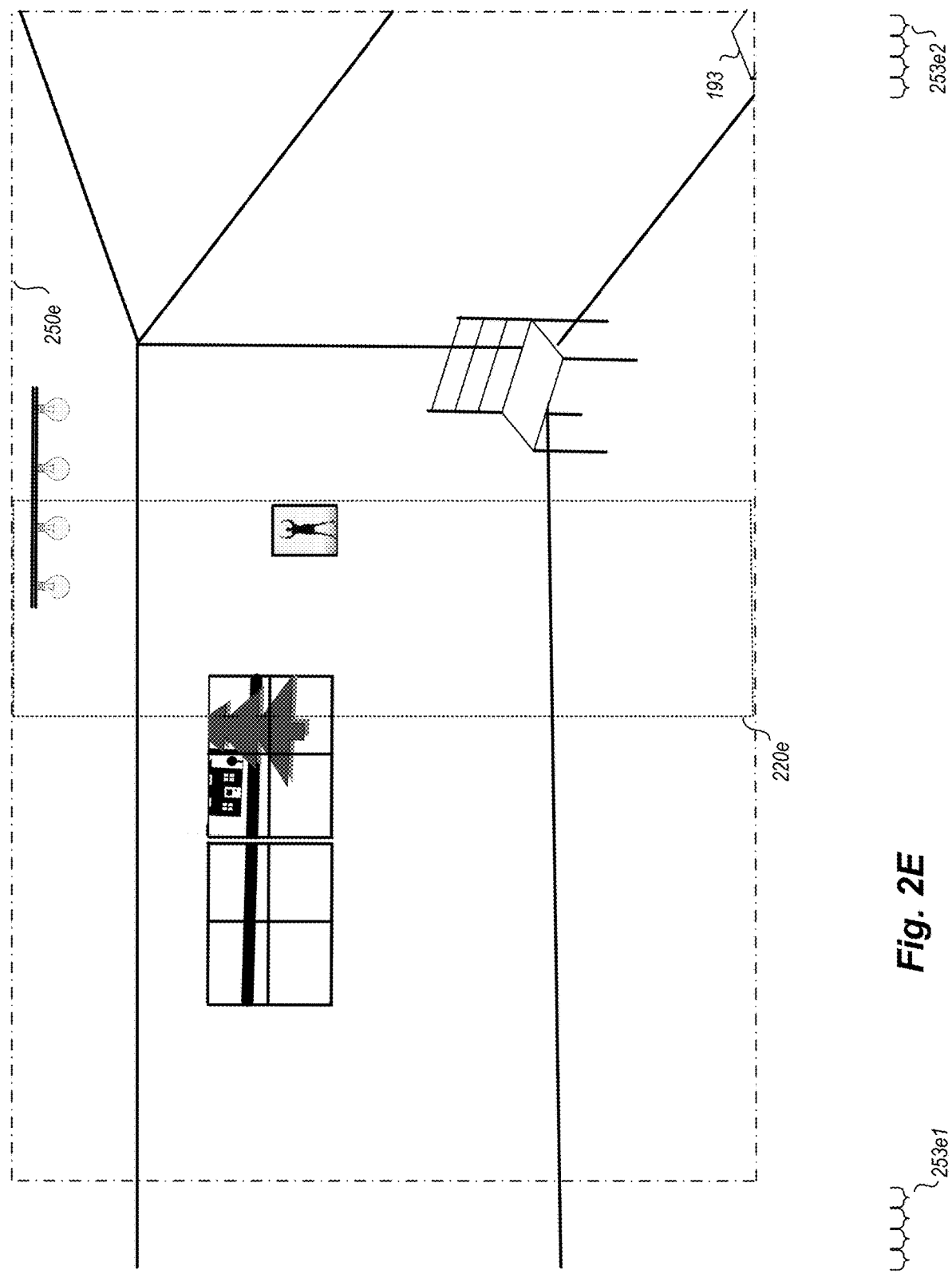
Figure 2F:
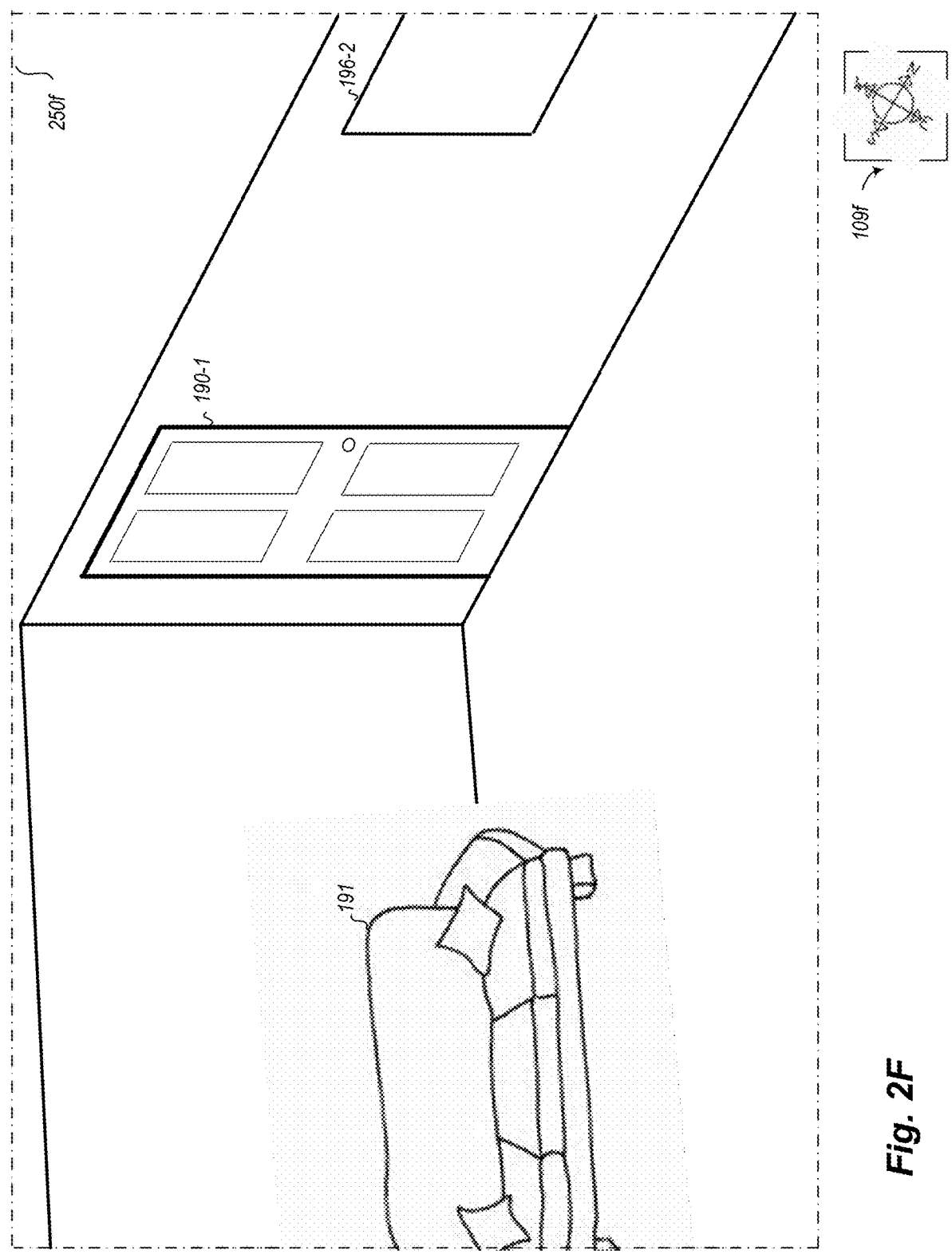
Figure 2G:
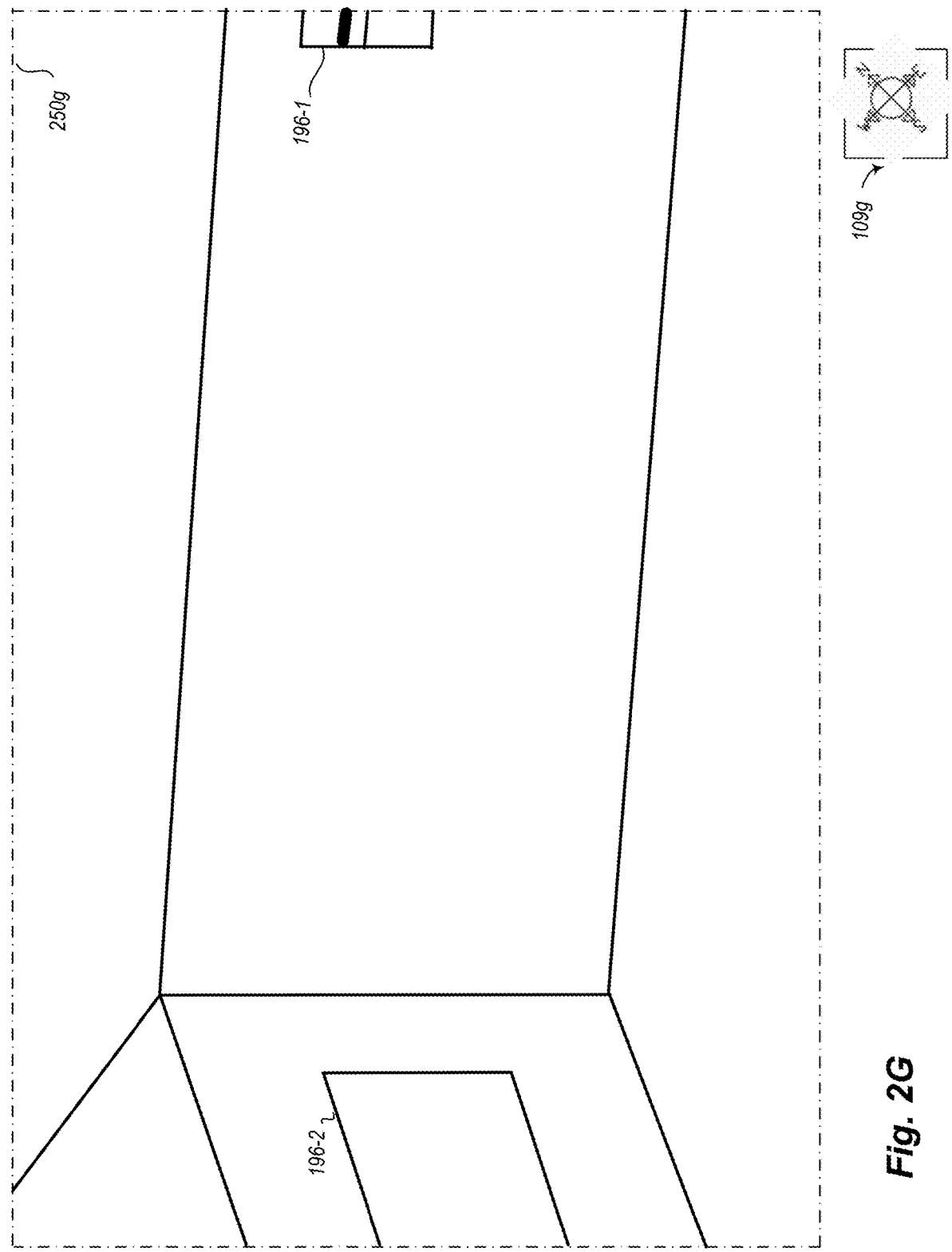
Figure 2H:
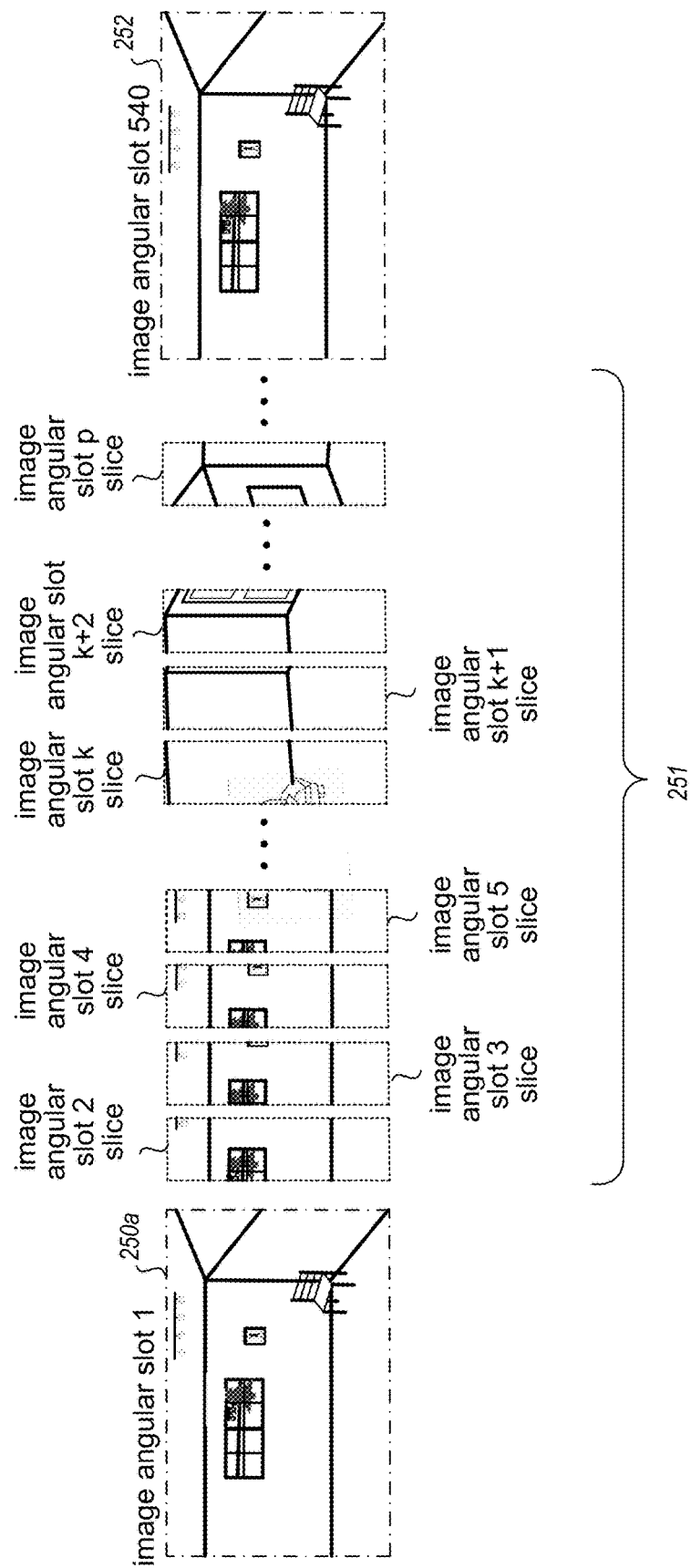
Figure 2I:
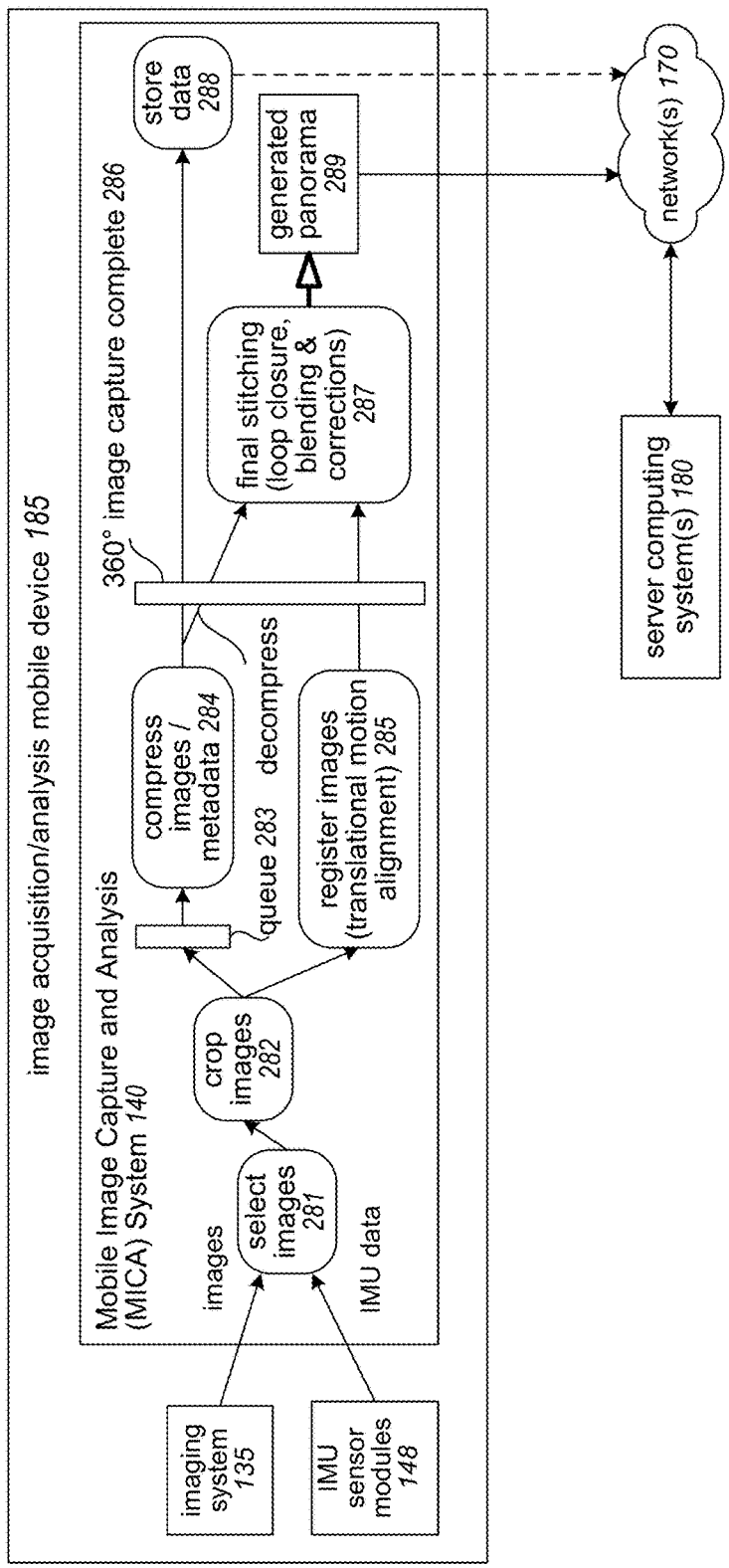

FIG. 2I further illustrates information 290i regarding the process for generating a panorama image from such constituent images, as discussed in greater detail elsewhere herein. In particular, in the example of FIG. 2I, the MICA system 140 is executing on the mobile device 185 to perform the panorama image generation. In this example, the MICA system 140 receives constituent images captured by the imaging system 135 on the mobile device 185, and obtains corresponding IMU data from sensor modules 148 for each such constituent image. The automated operations performed by the MICA system 140 include selecting 281 captured constituent images to use for each angular slot, and cropping 282 some or all selected constituent images. The cropped constituent images are then forwarded and queued 283 for temporary storage before the images and their associated metadata are compressed 284, and are also concurrently forwarded to processing 285 to register the constituent images, such as by aligning some or all adjacent constituent images via translational motion alignment (e.g., all but the first and last selected constituent images). After the compression processing 284, some or all of the compressed data is optionally sent 288 to long-term storage (e.g., non-volatile storage on the mobile device; storage on one or more remote systems, such as by transferring the data to one or more server computing systems 180 via one or more intermediate computer networks 170; etc.). In addition, some or all of the compressed data may be decompressed on-demand and provided for additional use, such as for use in processing 287 (and in some cases in processing 285, not shown). Furthermore, after the processing 285, and after the constituent image capture is complete 286, the registered images are forwarded to the processing 287 for final stitching to generate the panorama image, such as by using optical flow to complete the loop closure by aligning the first and last constituent images and by determining corresponding drift error, by distributing drift error across the constituent images, and by performing other smoothing and corrections and final processing as discussed elsewhere herein. The generated panorama 289 is then produced, and is forwarded to the server computing systems 180 for storage via the one or more computer networks 170. Additional details are included below regarding such automated operations, including with respect to the examples of FIGS. 2A-2H and their associated description.

The described techniques provide various benefits in various embodiments, including in some embodiments to perform all of the panorama image generation processing locally on the mobile device that acquired constituent images being combined for a panorama image being generated, such as to enable one or more such panorama images to be generated in manners not previously available and that are more rapid (e.g., in less than 1 minute after the capture of constituent images is completed) and accurate (e.g., using more constituent images and/or constituent images at higher resolutions) and efficient (e.g., using less or no communication bandwidth, with improved scalability from decentralized panorama image generation processing), for use in representing one or more acquisition locations within or around multi-room buildings and other structures. Such automated techniques further allow additional accuracy by using information acquired from the actual building environment (rather than from plans on how the building should theoretically be constructed), as well as enabling the capture of changes to structural elements and/or visual appearance elements that occur after a building is initially constructed. Such described techniques further provide benefits in allowing improved automated navigation of a building by mobile devices (e.g., semi-autonomous or fully-autonomous vehicles), based at least in part on the use of such generated panorama images, including to significantly reduce computing power and time used to attempt to otherwise learn a building's layout. In addition, in some embodiments the described techniques may be used to provide an improved GUI in which a user may more accurately and quickly obtain information about one or more such buildings (e.g., for use in virtually navigating an interior of the one or more buildings), including in response to search requests, as part of providing personalized information to the user, as part of providing value estimates and/or other information about a building to a user (e.g., after analysis of information about one or more target building floor plans that are similar to one or more initial floor plans or that otherwise match specified criteria), etc. Various other benefits are also provided by the described techniques, some of which are further described elsewhere herein.

As noted above, in at least some embodiments and situations, some or all of the images acquired for a building and subsequently associated with the building's floor plan may be panorama images that are each acquired at one of multiple acquisition locations in or around the building, such as to generate a panorama image at each such acquisition location from multiple constituent images acquired in multiple directions from the acquisition location (e.g., from a smartphone or other mobile device held by a user turning at that acquisition location, with some or all of the constituent images optionally being frames from one or more of videos taken at that acquisition location that cover 360° video horizontally from that acquisition location)—in other embodiments and situations, one or more panorama images may instead be generated using a simultaneous capture of all the image information for the panorama image (e.g., using one or more fisheye lenses), etc. In at least some embodiments, such techniques may include using one or more mobile devices (e.g., a camera having one or more fisheye lenses and mounted on a rotatable tripod or otherwise having an automated rotation mechanism; a camera having one or more fisheye lenses sufficient to capture 360 degrees horizontally without rotation; a smart phone held and moved by a user, such as to rotate the user's body and held smart phone in a 360° circle around a vertical axis; a camera held by or mounted on a user or the user's clothing; a camera mounted on an aerial and/or ground-based drone or other robotic device; etc.) to capture visual data from a sequence of multiple acquisition locations within multiple rooms of a house (or other building)—furthermore, in at least some such embodiments, such acquisition and subsequent use of acquired information may occur without having or using information from depth sensors or other distance-measuring devices about distances from images' acquisition locations to walls or other objects in a surrounding building or other structure. It will be appreciated that panorama images may in some situations be represented in a spherical coordinate system and provide up to 360° coverage around horizontal and/or vertical axes, such that a user viewing a panorama image may move the viewing direction within the panorama image to different orientations to cause different images (or "views") to be rendered within the panorama image (including, if the panorama image is represented in a spherical coordinate system, to convert the image being rendered into a planar coordinate system). Furthermore, acquisition metadata regarding the capture of such panorama images may be obtained and used in various manners, such as data acquired from IMU (inertial measurement unit) sensors or other sensors of a mobile device as it is carried by a user or otherwise moved between acquisition locations. Additional details are included elsewhere herein regarding operations of device(s) implementing an ICA system, such as to perform such automated operations, and in some cases to further interact with one or more ICA system operator user(s) in one or more manners to provide further functionality.

With respect to functionality of a Mapping Information Generation Manager (MIGM) system, it may perform automated operations in at least some embodiments to analyze multiple 360° panorama images (and optionally other images) that have been acquired for a building interior (and optionally an exterior of the building), and determine room shapes and locations of passages connecting rooms for some or all of those panorama images, as well as to determine wall elements and other elements of some or all rooms of the building in at least some embodiments and situations. The types of connecting passages between two or more rooms may include one or more of doorway openings and other inter-room non-doorway wall openings, windows, stairways, non-room hallways, etc., and the automated analysis of the images may identify such elements based at least in part on identifying the outlines of the passages, identifying different content within the passages than outside them (e.g., different colors or shading), etc. The automated operations may further include using the determined information to generate a floor plan for the building and to optionally generate other mapping information for the building, such as by using the inter-room passage information and other information to determine relative positions of the associated room shapes to each other, and to optionally add distance scaling information and/or various other types of information to the generated floor plan. In addition, the MIGM system may in at least some embodiments perform further automated operations to determine and associate additional information with a building floor plan and/or specific rooms or locations within the floor plan, such as to analyze images and/or other environmental information (e.g., audio) captured within the building interior to determine particular attributes (e.g., a color and/or material type and/or other characteristics of particular elements, such as a floor, wall, ceiling, countertop, furniture, fixtures, appliances, etc.; the presence and/or absence of particular elements, such as an island in the kitchen; etc.), or to otherwise determine relevant attributes (e.g., directions that building elements face, such as windows; views from particular windows or other locations; etc.). Additional details are included below regarding operations of computing device(s) implementing an MIGM system, such as to perform such automated operations and in some cases to further interact with one or more MIGM system operator user(s) in one or more manners to provide further functionality.

In at least some embodiments, a MICA system may operate in conjunction with one or more separate MIGM (Mapping Information Generation Manager) systems, and/or with one or more separate SDM (Similarity Determination Manager) systems for comparing target building information and otherwise identifying target buildings that have attributes satisfying specified criteria, and/or with one or more separate BMV (Building Map Viewer) systems for obtaining building information from one or more other systems and presenting or otherwise using that obtained information in one or more further manners, while in other embodiments such a MICA system may incorporate some or all functionality of such MIGM and/or SDM and/or BMV systems as part of the MICA system. In yet other embodiments, the MICA system may operate without using some or all of its described functionality, such as if the MICA system obtains information about some or all constituent images from an acquisition location from other sources before generating a panorama image for the acquisition location by combining the constituent images.

For illustrative purposes, some embodiments are described below in which specific types of information are acquired, used and/or presented in specific ways for specific types of structures and by using specific types of devices—however, it will be understood that the described techniques may be used in other manners in other embodiments, and that the invention is thus not limited to the exemplary details provided. As one non-exclusive example, while specific types of data structures (e.g., queues, caches, databases, 2D floor plans, 2.5D or 3D computer models, etc.) are generated and used in specific manners in some embodiments, it will be appreciated that other types of information to describe acquisition locations may be similarly generated and used in other embodiments, including for buildings (or other structures or layouts) separate from houses, and that generated panorama images and other building information may be used in other manners in other embodiments. In addition, the term "building" refers herein to any partially or fully enclosed structure, typically but not necessarily encompassing one or more rooms that visually or otherwise divide the interior space of the structure—non-limiting examples of such buildings include houses, apartment buildings or individual apartments therein, condominiums, office buildings, commercial buildings or other wholesale and retail structures (e.g., shopping malls, department stores, warehouses, etc.), supplemental structures on a property with another main building (e.g., a detached garage or shed on a property with a house), etc. The term "acquire" or "capture" as used herein with reference to a building interior, acquisition location, or other location (unless context clearly indicates otherwise) may refer to any recording, storage, or logging of media, sensor data, and/or other information related to spatial characteristics and/or visual characteristics and/or otherwise perceivable characteristics of the building interior or subsets thereof, such as by a recording device or by another device that receives information from the recording device. As used herein, the term "panorama image" may refer to a visual representation that is based on, includes or is separable into multiple discrete component images originating from a substantially similar physical location in different directions and that depicts a larger field of view than any of the discrete component images depict individually, including images with a sufficiently wide-angle view from a physical location to include angles beyond that perceivable from a person's gaze in a single direction. The term "sequence" of acquisition locations, as used herein, refers generally to two or more acquisition locations that are each visited at least once in a corresponding order, whether or not other non-acquisition locations are visited between them, and whether or not the visits to the acquisition locations occur during a single continuous period of time or at multiple different times, or by a single user and/or device or by multiple different users and/or devices. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify the same or similar elements or acts.

FIG. 1A is an example block diagram of various computing devices and systems that may participate in the described techniques in some embodiments. In particular, after panorama images are generated, they and associated information for them (e.g., annotations, metadata, inter-connection linking information, etc.) may be stored with information 164 on one or more server computing systems 180 for later use. Such generated panorama information 164 may further be included as part of captured building interior information 165 that is subsequently used by an MIGM (Mapping Information Generation Manager) system 160 executing on one or more server computing systems 180 (whether on the same or different server computing systems on which the information 164 is stored) to generate corresponding building floor plans and/or other related mapping information 155. FIG. 2K shows one example of such a floor plan, as discussed further below, and additional details related to the automated operation of the MIGM system are included elsewhere herein, including with respect to FIGS. 6A-6B. The captured building interior information 165 may further include other types of information acquired from a building environment, such as additional images and/or other types of data captured in or around a building, as discussed in greater detail elsewhere herein.

Figure 1B:
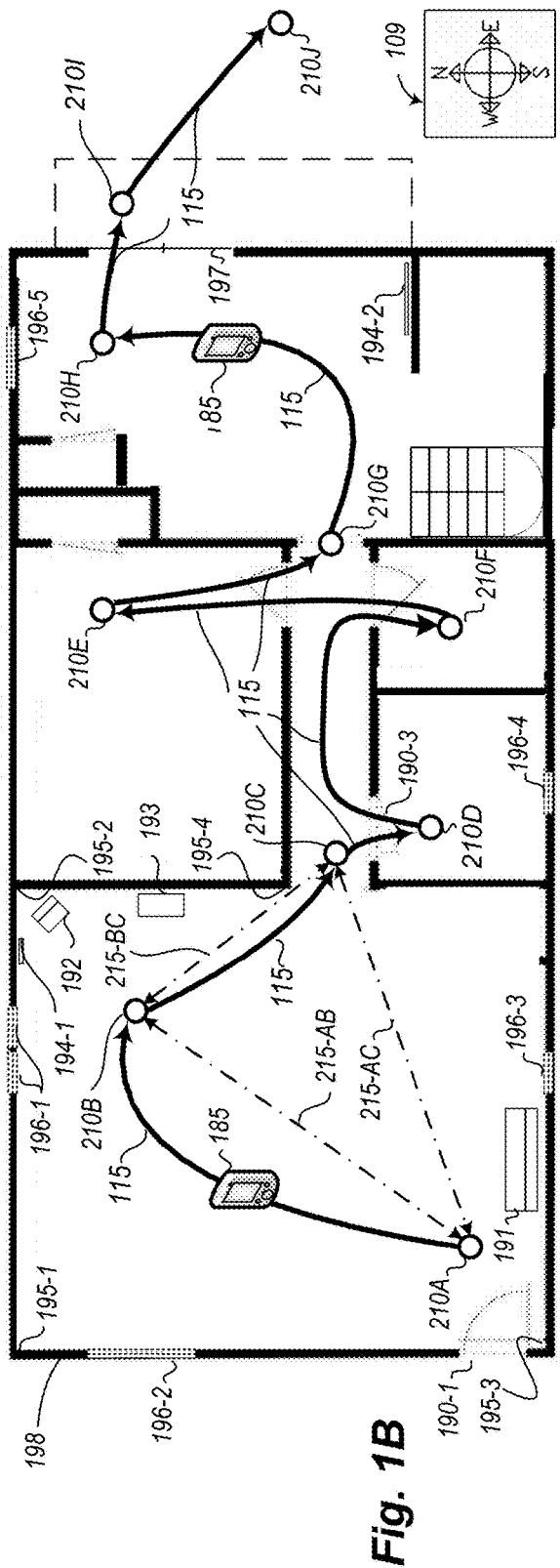

The generation of the panorama images is performed in the illustrated embodiment of FIG. 1A by a MICA (Mobile Image Capture and Analysis) system 140 executing on an image acquisition and analysis mobile device 185. As part of the automated panorama image generation, one or more processing modules 145 of the MICA system in memory 152 of the mobile device may be executed by one or more hardware processors 132 of the mobile device to acquire various constituent images and associated metadata 142 using one or more imaging systems 135 of the mobile device, and to combine at least some of the captured constituent images into one or more generated panorama images 143, which are subsequently transferred over one or more computer networks 170 to the storage 164 on the server computing system(s) 180. Such automated operations of the MICA system may include, for example, generating multiple panorama images for multiple acquisition locations within a building or other structure, and optionally linking those panorama images together into a group of inter-connected linked panorama images that represent some or all of that building or other structure (e.g., by determining directions and relative distances between respective pairs of acquisition locations, and defining corresponding inter-panorama links within the panorama images that each point to another of the panorama images). As part of the operations of the MICA system, various other hardware components of the mobile device 185 may be further used, such as the display system 149 (e.g., to display instructions and/or constituent image information), device I/O components 147 (e.g., to receive instructions from and present information to the user), sensor modules 148 that include an IMU gyroscope 148a and an IMU accelerometer 148b and an IMU compass 148c (e.g., to acquire and associate sensor data with the acquisition of particular corresponding constituent images), etc. FIG. 1B shows one example of such acquisition of panorama images for a particular house 198, FIG. 2K shows one example of a group of inter-connected linked panorama images for the house 198, and FIGS. 2A-2J show examples of automated operations of the MICA system in generating such panorama images.

One or more users (not shown) of one or more client computing devices 105 may further optionally interact over the computer networks 170 with the MIGM system 160, such as to assist in building floor plans and in subsequently using the identified floor plans in one or more further automated manners—such interactions by the user(s) may include, for example, providing instructions for creating building floor plans, providing information to include with created building floor plans, obtaining and optionally interacting with one or more particular identified floor plans and/or with additional associated information, etc. In addition, one or more users (not shown) of one or more client computing devices 175 may further optionally interact over the computer networks 170 with the server computing systems 180, such as to retrieve and use building floor plans and/or inter-connected linked panorama images and/or individual panorama images and/or other information associated with building floor plans or inter-connected linked panorama images—such interactions by the user(s) may include, for example, obtaining and optionally interacting with one or more particular identified floor plans and/or one or more particular groups of inter-connected linked panorama images and/or with additional associated information (e.g., to change between a floor plan view and a view of a particular image at an acquisition location within or near the floor plan; to change between views of two or more inter-connected linked panorama images (e.g., via corresponding links included in the presented panorama images); to change the horizontal and/or vertical viewing direction from which a corresponding view of a panorama image is displayed, such as to determine a portion of a panorama image to which a current user viewing direction is directed, etc.). In addition, a floor plan (or portion of it) may be linked to or otherwise associated with one or more other types of information, including for a floor plan of a multi-story or otherwise multi-level building to have multiple associated sub-floor plans for different stories or levels that are interlinked (e.g., via connecting stairway passages), for a two-dimensional ("2D") floor plan of a building to be linked to or otherwise associated with a three-dimensional ("3D") rendering of the building, etc. Also, while not illustrated in FIG. 1A, in some embodiments the client computing devices 175 (or other devices, not shown), may receive and use information about identified floor plans and/or inter-connected linked panorama images and/or other mapping-related information in additional manners, such as to control or assist automated navigation activities by those devices (e.g., by autonomous vehicles or other devices), whether instead of or in addition to display of the identified information.

In addition, in the depicted computing environment of FIG. 1A, the network 170 may be one or more publicly accessible linked networks, possibly operated by various distinct parties, such as the Internet. In other implementations, the network 170 may have other forms. For example, the network 170 may instead be a private network, such as a corporate or university network that is wholly or partially inaccessible to non-privileged users. In still other implementations, the network 170 may include both private and public networks, with one or more of the private networks having access to and/or from one or more of the public networks. Furthermore, the network 170 may include various types of wired and/or wireless networks in various situations. In addition, the client computing devices 175 and server computing systems 180 may include various hardware components and stored information, as discussed in greater detail below with respect to FIG. 3.

Additional details related to embodiments of a system providing at least some such functionality of a MICA system are included in co-pending U.S. Non-Provisional patent application Ser. No. 17/064,601, filed Oct. 7, 2020 and entitled "Connecting And Using Building Data Acquired From Mobile Devices" (which includes disclosure of an example BICA system that is generally directed to obtaining and inter-connecting and using panorama images from within one or more buildings or other structures); in U.S. Non-Provisional patent application Ser. No. 17/082,044, filed Oct. 28, 2020 and entitled "Automated Control Of Image Acquisition Via Acquisition Location Determination" (which includes disclosure of an example ICA system that is generally directed to obtaining and using panorama images from within one or more buildings or other structures); in U.S. Non-Provisional patent application Ser. No. 17/019,247, filed Sep. 12, 2020 and entitled "Automated Mapping Information Generation From Inter-Connected Images" (which includes disclosure of an example ICA system that is generally directed to obtaining and using panorama images from within one or more buildings or other structures); in U.S. Non-Provisional patent application Ser. No. 17/080,604, filed Oct. 26, 2020 and entitled "Generating Floor Maps For Buildings From Automated Analysis Of Visual Data Of The Buildings' Interiors"; and in U.S. Provisional Patent Application No. 63/035,619, filed Jun. 5, 2020 and entitled "Automated Generation On Mobile Devices Of Panorama Images For Buildings Locations And Subsequent Use"; each of which is incorporated herein by reference in its entirety.

FIG. 1B depicts a block diagram of an exemplary building interior environment in which panorama images have been generated and are ready for use (e.g., to generate and provide corresponding inter-connected linked panorama images, to generate and provide a corresponding building floor plan, etc.), as well as for use in presenting the generated panorama images and/or associated information to users. In particular, FIG. 1B includes a building 198 with an interior that was captured at least in part via multiple panorama images, such as by a user (not shown) carrying a mobile device 185 with image acquisition capabilities through the building interior to a sequence of multiple acquisition locations 210. An embodiment of the MICA system (e.g., MICA system 140 executing on the user's mobile device 185) may automatically perform or assist in the capturing of the data representing the building interior, as well as further analyze the captured data to generate panorama images providing a visual representation of the building interior and optionally inter-connect the generated panorama images. While the mobile device of the user may include various hardware components, such as one or more cameras or other imaging systems 135, one or more sensors 148 (e.g., a gyroscope 148a, an accelerometer 148b, a compass 148c, etc., such as part of one or more IMUs, or inertial measurement units, of the mobile device; an altimeter; light detector; etc.), a GPS receiver, one or more hardware processors 132, memory 152, a display 149, a microphone, etc., the mobile device may not in at least some embodiments have access to or use equipment to measure the depth of objects in the building relative to a location of the mobile device, such that relationships between different panorama images and their acquisition locations may be determined in part or in whole based on matching elements in different images and/or by using information from other of the listed hardware components, but without using any data from any such depth sensors. In addition, while directional indicator 109 is provided for reference of the viewer, the mobile device and/or MICA system may not use such absolute directional information in at least some embodiments, such as to instead determine relative directions and distances between panorama images 210 without regard to actual geographical positions or directions.

In operation, a user associated with the mobile device arrives at a first acquisition location 210A within a first room of the building interior (in this example, an entryway from an external door 190-1 to the living room), and captures a view of a portion of the building interior that is visible from that acquisition location 210A (e.g., some or all of the first room, and optionally small portions of one or more other adjacent or nearby rooms, such as through doors, halls, stairs or other connecting passages from the first room) as the mobile device is rotated around a vertical axis at the first acquisition location (e.g., with the user turning his or her body in a circle while holding the mobile device stationary relative to the user's body). The actions of the user and/or the mobile device may be controlled or facilitated via use of one or more programs executing on the mobile device, such as MICA application system 140, and the view capture may be performed by taking a succession of one or more images and/or recording a video with numerous frame images, including to capture visual information depicting a number of objects or other elements (e.g., structural details) that may be visible in images (e.g., video frames) captured from the acquisition location. In the example of FIG. 1B, such objects or other elements include various elements that are structurally part of the walls (or "wall elements"), such as the doorways 190 and 197 and their doors (e.g., with swinging and/or sliding doors), windows 196, inter-wall borders (e.g., corners or edges) 195 (including corner 195-1 in the northwest corner of the building 198, corner 195-2 in the northeast corner of the first room, and corner 195-e in the southwest corner of the first room)—in addition, such objects or other elements in the example of FIG. 1B may further include other elements within rooms, such as furniture 191-193 (e.g., a couch 191; chair 192; table 193; etc.), pictures or paintings or televisions or other objects 194 (such as 194-1 and 194-2) hung on walls, light fixtures, etc. The user may also optionally provide a textual or auditory identifier to be associated with an acquisition location, such as "entry" for acquisition location 210A or "living room" for acquisition location 210B, while in other embodiments the ICA system may automatically generate such identifiers (e.g., by automatically analyzing video and/or other recorded information for a building to perform a corresponding automated determination, such as by using machine learning) or the identifiers may not be used.

After the first acquisition location 210A has been adequately captured (e.g., by a full rotation of the mobile device), the user may proceed to a next acquisition location (such as acquisition location 210B), optionally capturing movement data during travel between the acquisition locations, such as video and/or other data from the hardware components (e.g., from one or more IMUs, from the camera, etc.). At the next acquisition location, the user may similarly use the mobile device to capture one or more images from that acquisition location. This process may repeat from some or all rooms of the building and optionally external to the building, as illustrated for acquisition locations 210C-210J. The acquired video and/or other images for each acquisition location are further analyzed to generate a panorama image for each of acquisition locations 210A-210J, including in some embodiments to match objects and other elements in different images. In addition to generating such panorama images, further analysis may be performed in order to inter-connect (or 'link') at least some of the panoramas together (with some corresponding lines 215 between them being shown for the sake of illustration), such as to determine relative positional information between pairs of acquisition locations that are visible to each other, to store corresponding inter-panorama links (e.g., links 215-AB, 215-BC and 215-AC between acquisition locations A and B, B and C, and A and C, respectively), and in some embodiments and situations to further link at least some acquisition locations that are not visible to each other (e.g., a link 215-BE, not shown, between acquisition locations 210B and 210E).

Additional details related to embodiments of generating and using linking information between panorama images, including using travel path information and/or elements or other features visible in multiple images, are included in U.S. Non-Provisional patent application Ser. No. 16/693, 286, filed Nov. 23, 2019 and entitled "Connecting And Using Building Data Acquired From Mobile Devices" (which includes disclosure of an example BICA system that is generally directed to obtaining and using linking information to inter-connect multiple panorama images captured within one or more buildings or other structures); in U.S. Non-Provisional patent application Ser. No. 17/080,604, filed Oct. 26, 2020 and entitled "Generating Floor Maps For Buildings From Automated Analysis Of Visual Data Of The Buildings' Interiors"; and in U.S. Provisional Patent Application No. 63/035,619, filed Jun. 5, 2020 and entitled "Automated Generation On Mobile Devices Of Panorama Images For Buildings Locations And Subsequent Use"; each of which is incorporated herein by reference in its entirety.

Various details are provided with respect to FIGS. 1A-1B, but it will be appreciated that the provided details are non-exclusive examples included for illustrative purposes, and other embodiments may be performed in other manners without some or all such details.

FIGS. 2A-2K illustrate examples of automatically generating a 360° panorama image on a mobile device for an acquisition location in a building interior by combining multiple constituent perspective images acquired by the mobile device in multiple directions from the acquisition location, as well as subsequently using the generated panorama image in one or more automated manners, such as for the building 198 discussed in FIG. 1B.

In particular, FIG. 2A illustrates an example constituent image 250a taken in a northeasterly direction from acquisition location 210B in the living room of house 198 of FIG. 1B, such as for use as a first constituent image in a sequence of constituent images acquired in a full 360° horizontal circle from acquisition location 210B—the directional indicator 109a is further displayed in this example to illustrate the northeasterly direction in which the image is taken. In the illustrated example, the displayed image includes built-in elements (e.g., light fixture 130a), furniture (e.g., chair 192-1), two windows 196-1, and a picture 194-1 hanging on the north wall of the living room. No inter-room passages into or out of the living room (e.g., doors or other wall openings) are visible in this image. However, multiple room borders are visible in the image 250a, including horizontal borders between a visible portion of the north wall of the living room and the living room's ceiling and floor, horizontal borders between a visible portion of the east wall of the living room and the living room's ceiling and floor, and the inter-wall vertical border 195-2 between the north and east walls.

FIG. 2B continues the example of FIG. 2A, and illustrates an additional example constituent image 250b taken from acquisition location 210B, such as for use as the second constituent image in the sequence of acquired constituent images. In this example, a small amount of clockwise rotation has occurred at acquisition location 210B from the direction at which the previous constituent image 250a was taken, such that constituent image 250b differs from previous constituent image 250a by only a small amount—in particular, indicator 253b1 illustrates a portion that was part of constituent image 250a that is no longer part of constituent image 250b, while indicator 253b2 indicates an additional portion of constituent image 250b that was not part of constituent image 250a. Various numeric labels that were shown in FIG. 2A are not illustrated in FIG. 2B for the sake of brevity. In addition, a visual indicator 220b is further illustrated in FIG. 2B corresponding to a middle 20% slice of the constituent image 250b that may be cropped from the constituent image 250b and used as part of the panorama image generation process, as discussed further with respect to FIG. 2H.

FIG. 2C continues the examples of FIGS. 2A-2B, and illustrates an additional example constituent image 250c taken from acquisition location 210B, such as for use as the third constituent image in the sequence of acquired constituent images. In this example, a small amount of additional clockwise rotation has occurred at acquisition location 210B from the direction at which the previous constituent image 250b was taken, such that constituent image 250c differs from previous constituent image 250b by only a small amount—in particular, indicator 253c1 illustrates a portion that was part of constituent image 250b that is no longer part of constituent image 250c, while indicator 253c2 indicates an additional portion of constituent image 250c that was not part of constituent image 250b. Various numeric labels that were shown in FIG. 2A are not illustrated in FIG. 2C for the sake of brevity. In addition, a visual indicator 220c is further illustrated in FIG. 2C corresponding to a middle 20% slice of the constituent image 250c that may be cropped from the constituent image 250c and used as part of the panorama image generation process, as discussed further with respect to FIG. 2H.

FIG. 2D continues the examples of FIGS. 2A-2C, and illustrates an additional example constituent image 250d taken from acquisition location 210B, such as for use as the fourth constituent image in the sequence of acquired constituent images. In this example, a small amount of additional clockwise rotation has occurred at acquisition location 210B from the direction at which the previous constituent image 250c was taken, such that constituent image 250d differs from previous constituent image 250c by only a small amount—in particular, indicator 253d1 illustrates a portion that was part of constituent image 250c that is no longer part of constituent image 250d, while indicator 253d2 indicates an additional portion of constituent image 250d that was not part of constituent image 250c. Various numeric labels that were shown in FIG. 2A are not illustrated in FIG. 2D for the sake of brevity, but FIG. 2D illustrates a new item in the room (table 193) that is entering the constituent image due to the rotation at acquisition location 210B. In addition, a visual indicator 220d is further illustrated in FIG. 2D corresponding to a middle 20% slice of the constituent image 250d that may be cropped from the constituent image 250d and used as part of the panorama image generation process, as discussed further with respect to FIG. 2H.

FIG. 2E continues the examples of FIGS. 2A-2D, and illustrates an additional example constituent image 250e taken from acquisition location 210B, such as for use as the fifth constituent image in the sequence of acquired constituent images. In this example, a small amount of additional clockwise rotation has occurred at acquisition location 210B from the direction at which the previous constituent image 250d was taken, such that constituent image 250e differs from previous constituent image 250d by only a small amount—in particular, indicator 253e1 illustrates a portion that was part of constituent image 250d that is no longer part of constituent image 250e, while indicator 253e2 indicates an additional portion of constituent image 250e that was not part of constituent image 250d. Various numeric labels that were shown in FIG. 2A are not illustrated in FIG. 2D for the sake of brevity, but FIG. 2E illustrates an additional amount of table 193 that is entering the constituent image due to the rotation at acquisition location 210B. In addition, a visual indicator 220e is further illustrated in FIG. 2E corresponding to a middle 20% slice of the constituent image 250e that may be cropped from the constituent image 250e and used as part of the panorama image generation process, as discussed further with respect to FIG. 2H.

FIG. 2F continues the examples of FIGS. 2A-2E, and illustrates an additional perspective image 250f taken in a southwesterly direction in the living room of house 198 of FIG. 1B, such as from acquisition location 210B and as part of acquiring constituent images for a full 360° horizontal circle at that acquisition location—the directional indicator 109f is further displayed to illustrate the southwesterly direction in which the image is taken. It will be appreciated that a large number of other intermediate constituent images between image 250e of FIG. 2E and image 250f of FIG. 2F will be acquired from acquisition location 210B and used as part of the panorama image generation process, but such other intermediate constituent images are not illustrated for the sake of brevity. In this example image 250f, a portion of window 196-2 is visible, as is a couch 191 and visual horizontal and vertical room borders in a manner similar to that of FIG. 2A. This example image 250f further illustrates an inter-room passage for the living room, which in this example is a door 190-1 to enter and leave the living room (which FIG. 1B identifies as a door to the west exterior of the house).

FIG. 2G continues the examples of FIGS. 2A-2F, and illustrates an additional perspective image 250g taken in a northwesterly direction in the living room of house 198 of FIG. 1B, such as from acquisition location 210B and as part of acquiring constituent images for a full 360° horizontal circle at that acquisition location—the directional indicator 109g is further displayed to illustrate the northwesterly direction in which the image is taken. It will be appreciated that a large number of other intermediate constituent images between image 250f of FIG. 2F and image 250g of FIG. 2G will be acquired from acquisition location 210B and used as part of the panorama image generation process, but such other intermediate constituent images are not illustrated for the sake of brevity. In this example image 250g, a small portion of one of the windows 196-1 is visible, along with a portion of window 196-2. In addition, horizontal and vertical room borders are visible in image 250g in a manner similar to that of FIG. 2A. It will be further appreciated that a large number of additional intermediate constituent images after image 250g of FIG. 2G and before returning to an angle direction from acquisition location 210B corresponding to image 250a of FIG. 2A (or to a last angular slot just before reaching image 250a) will be acquired from acquisition location 210B and used as part of the panorama image generation process, but such other additional intermediate constituent images are also not illustrated for the sake of brevity.

FIG. 2H continues the examples of FIGS. 2A-2G, and illustrates information 290h that shows a sequence of constituent images that have been selected and cropped for use in being combined as part of generating a panorama image from acquisition location 210B. In this example, the first selected constituent image for image angular slot 1 (of 540 total angular slots in this example) is image 250a of FIG. 2A, and the last selected constituent image for image angular slot 540 is image 252 (which corresponds to a rotation amount slightly less than a full 360°), with those first and last selected constituent images not being cropped in this example. In addition, the selected constituent image slices include a variety of additional cropped constituent image slices 251 for additional image angular slots (e.g., 538 additional cropped constituent image slices in this example, which uses 540 total angular slots), with the image 2 to 5 slices corresponding to portions 220b-220e of images 250b-250e of FIGS. 2B-2E, with the image k to k+2 slices being visible as part of image 250f of FIG. 2F but corresponding to three constituent images captured in slightly different angular directions similar to that of image 250f, and with the image p corresponding to image 250g of FIG. 2G. It will be appreciated that a variety of additional constituent image slices will be acquired and used as part of the panorama image generation process, and that different amounts of cropping for different constituent images may be used in other embodiments and situations.

FIG. 2I further illustrates information 290i regarding the process for generating a panorama image from such constituent images, as discussed in greater detail elsewhere herein. In one specific embodiment, the processing performed for generating such a panorama image is performed in the following non-exclusive manner, although other embodiments may use other processing steps:

capturing constituent images (e.g., camera frames) and corresponding IMU device orientation sensor data The constituent image capture may be performed during mobile device rotation at 60 Hz (60 images/second), using 540 full HD constituent images (e.g., at 1080p resolution, such as with 1920×1080 pixels) per 360-degree rotation, or using 540 or less 4K resolution ultrawide 120-degree constituent images (e.g., with 3840 pixels by 2160 pixels). The amount of memory used, for example, be limited to ~600 MB.

selecting best constituent image for each 1/540th angular slot (e.g., from 2-3 candidate constituent images, such as by considering factors such as focus and/or skew), but occasionally do not fill a slot with a constituent image if no acceptable candidate is available. In some embodiments, based on the mobile device characteristics (including available RAM and processor speed), the resolution of the captured constituent images and/or the quantity of constituent images used may be varied (e.g., how frequently a constituent image is captured as the mobile device is rotated).

cropping constituent images selectively based on the device's motion in order to discard unneeded data during smooth movement while preserving additional context during jumps. Thus, while the middle 20% of most constituent images may be cropped and used, other constituent images may include more (e.g., all, such as for the first and last constituent images for use wrap-around alignment at end), including if exceptions occur (e.g., if there is empty adjacent slot; if the user has to recapture a constituent image, including if there was a capture discontinuity in which a capture heuristic was violated, such as if the user moved too quickly, pitched up or down too far, or tilted too far, which resulted in the system guiding the user to stop and turn back, in which case the last constituent image before this discontinuity and the first constituent image after the discontinuity would be cropped less; if rotation occurred quickly or system computing resource usage was unusually high at certain points during capture which prevented capture of any constituent image that could serve as a candidate for a given angular slot, retaining more of the prior and/or subsequent constituent images based on how many slots were "skipped"; if the rotation was moving very slowly and multiple captured constituent images were discarded, retaining more of the constituent image based on how many intermediate constituent images were discarded; etc.).—maintaining a queue of captured constituent images, asynchronously applying compression to these constituent images (e.g., to bound memory usage) and to secondary processed data such as frame buffers and other metadata. In addition, may later decompress data on demand during the registration phase and/or final stitching phase, including to maintain a least-recently-used cache with data for 10-50 decompressed constituent images. The compression used may be lossy (e.g., JPEG or HEIC). In some embodiments, the compression algorithm used and/or the size of the cache of decompressed constituent images may be dynamically varied, such as based on the mobile device characteristics (e.g., available RAM, processor speed, the presence of compression acceleration, etc.), and the compression may be performed on a secondary thread with lower priority to allow its performance to vary based on available computing resources, with the coordination of two or more concurrent threads being managed while their relative throughput varies based on processor speed.

(registration phase) concurrently, performing image registration on cropped constituent images in order to determine their relative alignment, including starting it during constituent image capture and continuing it asynchronously to maximize computing resource utilization and reduce the wait time until a final result is available. This may include computing transforms between adjacent strips (e.g., given the spatial proximity between adjacent constituent images, aligning them using a simple motion mod& such as a translational motion model)—such a motion model between adjacent constituent images (except for between the first and last constituent images) uses translation (which is a reasonable approximation given the small motion of 0.67°, and is akin to assuming a pushbroom camera model in which a linear array of pixels is moved in the direction perpendicular to its length; and the image is constructed by concatenating the 1D images), and in some embodiments may further use IMU motion data as part of the translational motion alignment for two or more constituent images (e.g., for constituent image slices selected for adjacent angular slots). Such an image is multi-perspective, because different parts of the image have different camera centers, with a thin swath from each constituent image being used (with the exception of the first and last constituent images, due to the possible large motion between the first and last images). In some embodiments, as an image is captured, it is down-sampled (once) and cropped, and then registered with the previous cropped constituent image, with corresponding relative transforms between adjacent images being computed on-the-fly as the constituent images are captured—in some such embodiments, if there is insufficient texture in the images (e.g., the images are of a textureless wall), the motion defaults to a horizontal translation equal to the theoretical shift given the camera focal length. Next, these relative transforms are concatenated to produce absolute transforms between each image strip and the first constituent image, which are used to estimate the length of the panorama in pixels.

(final stitching phase) after the user has completed a full rotation and the registration pass has completed, performing a second stitching pass to combine the captured and registered images into a full panorama. The final stitching phase may include computing the transform between the first and last constituent images using the whole constituent images for registration (e.g., based on optical flow and/or (2D point) feature-based registration instead of direct dense registration, including using detected corresponding points and motion from one constituent image to the other prior to warping, to produce the homography (2D perspective transform) $H_{N-1,0}$; based on spline-based models; based on other motion models; etc.). In some embodiments, since pixels in the central vertical strips are blended to provide closer alignment at the center of the images, corresponding points located at the image periphery are culled, Since a shift in viewpoint between the first and last constituent images may exist, to mitigate the blending artifacts in loop closure, full-constituent image optical flow is applied between these images, to warp them towards each other. The final stitching phase may further include closing the loop by computing the drift error between the first and last constituent images, and distributing it across the other constituent images. In particular, it is highly unlikely that the concatenated translation that maps first to last constituent images ($t_{N-1,0}$) and the full-constituent image homography ($H_{N-1,0}$) correspond. For loop closure, the concatenated transforms for constituent images are updated such that the concatenated transform for the last constituent image is consistent with $H_{N-1,0}$ by first computing the errors in transforming the corners of the image in the last constituent image (represented as dA, dB, dC and dD), with the shifts in the transformed corner for each concatenated transform for constituent images being adjusted by $dA/(N-1)$, $dB/(N-1)$, $dC/(N-1)$, and $dD/(N-1)$, where N is the quantity of constituent images and/or image angular slots. The adjusted transforms are then updated by computing the homographies that result in the adjusted corners. The final stitching phase may further include smoothing the exposure (i.e., reducing high-frequency exposure variation) by finding changes in intensity between overlapping adjacent constituent images, such as if the camera auto-exposes as it is manually rotated, are there are significant changes in intensities between nearby constituent images, with vertical intensity-based artifacts being evident (despite using blending described in the next step). For each pair of adjacent images, the computed motion is used to find overlap between them. The average colors in the overlap regions are computed, from which intensity ratios are computed. These ratios are concatenated across the panorama, and adjustments are made for loop closure in a similar manner as the spatial transforms. The difference is that anchor constituent images are used (e.g.; five anchor constituent images spaced equally along the panorama) where the original intensities are preserved, which significantly reduces color drift. The final stitching phase may further include smoothing spatial overlaps to reduce artifacts by blending (feathering) adjacent strips, so as to hide slight changes between adjacent constituent images (either due to parallax or exposure changes) by blending (feathering) the strips using an S-curve profile for alpha blending. The feathering algorithm is complicated by the homographies, since a rectangle is warped to some arbitrary quadrilateral. Additional book-keeping is done by computing the transformed corners, using the Bresenham algorithm to figure out the line segments that define the warped footprint, and using the knowledge of the footprint for blending. The final stitching phase may further include performing additional cropping by computing a bounding box that excludes/leaves out uncovered (black) regions, such as by using the maximum bounding box that excludes blank areas. The bounding box is extracted by finding the union of the footprints of the warped images (in a similar manner as the step described above for computing the footprint for blending), and computing the largest vertical range with non-blank pixels.

at any time after interactive capture is complete but before first and second stitching passes have finished, if the MICA system (or mobile device) determines or is instructed to suspend the processing for panorama image generation (e.g., to reclaim short-term memory and processing computing resources, such as in order to capture a second panorama or background; to shut down; etc.), compressed captured data is written to long-term storage, and then processing may be later restarted using this data archive at a later time.

It will be appreciated that various details have been provided with respect to this example description corresponding to FIG. 2I, as non-exclusive examples included for illustrative purposes, and that other embodiments may be performed in other manners without some or all such details.

Figure 2J:
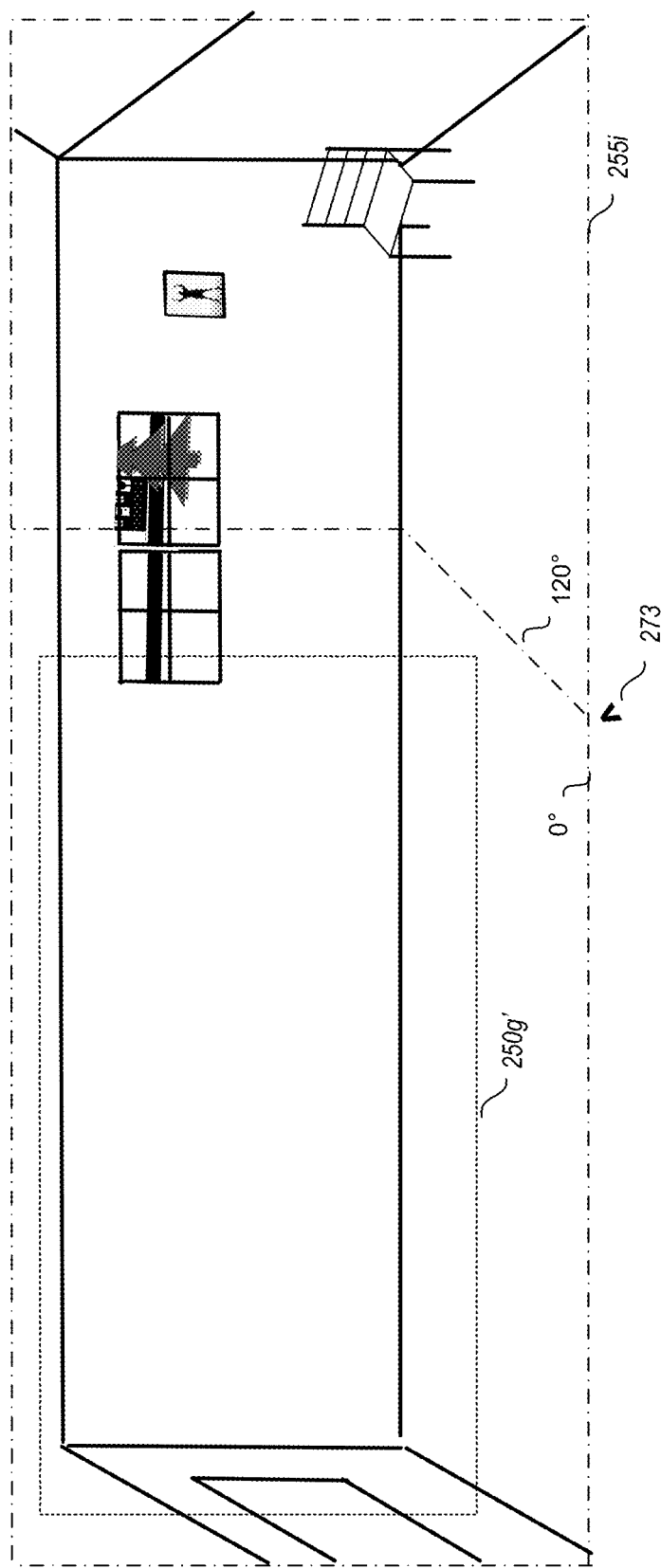
Figure 2K:
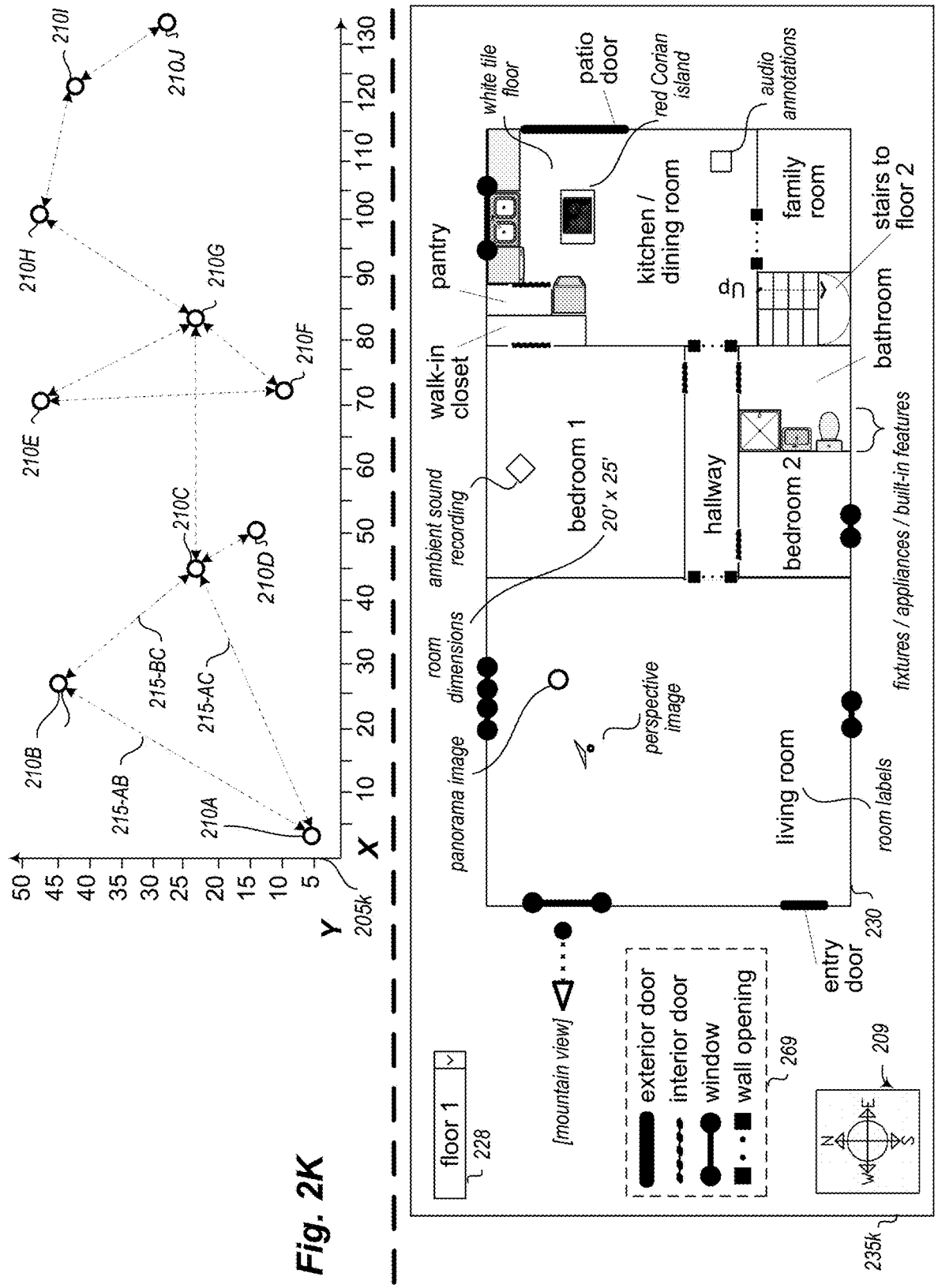

FIG. 2J continues the examples of FIGS. 2A-2I, and illustrates an additional image 255i separate from the images captured at the acquisition locations 210 of FIG. 1B (e.g., the example images discussed with respect to FIGS. 2A-2H). In this example, the image 255i is a 120° ultrawide image taken from an acquisition location in the northern center of the living room in a direction 273, although 180° total of horizontal coverage (an additional 60° beyond the ultrawide image) are shown for context purposes, and an example 250g' is shown that corresponds approximately to constituent image 250g of FIG. 2G. As discussed in greater detail elsewhere herein, in some embodiments some or all of the constituent images used may be ultrawide images such as image 255*i*—in such embodiments, the ultrawide constituent images may be cropped in manners similar to or different from those of other constituent images (e.g., to use additional vertical information that is available in such ultrawide images, but the same middle 20% crop for most constituent image slices; to use narrower or wider middle crop slices; etc.).

FIG. 2K illustrates one example 235*k* of a 2D floor plan for the house 198, such as may be presented to an end-user in a GUI, with the living room being the most westward room of the house (as reflected by directional indicator 209)—it will be appreciated that a 3D or 2.5D computer model with wall height information may be similarly generated and displayed in some embodiments, whether in addition to or instead of such a 2D floor plan. Various types of information are illustrated on the 2D floor plan 235*k* in this example. For example, such types of information may include one or more of the following: room labels added to some or all rooms (e.g., "living room" for the living room); room dimensions added for some or all rooms; visual indications of fixtures or appliances or other built-in features added for some or all rooms; visual indications added for some or all rooms of positions of additional types of associated and linked information (e.g., of other panorama images and/or perspective images that an end-user may select for further display, of audio annotations and/or sound recordings that an end-user may select for further presentation, etc.); visual indications added for some or all rooms of doors and windows; visual indications of built-in features (e.g., a kitchen island); visual indications of installed fixtures and/or appliances (e.g., kitchen appliances, bathroom items, etc.); visual indications of appearance and other surface information (e.g., color and/or material type and/or texture for installed items such as floor coverings or wall coverings or surface coverings); visual indications of views from particular windows or other building locations and/or of other information external to the building (e.g., a type of an external space; items present in an external space; other associated buildings or structures, such as sheds, garages, pools, decks, patios, walkways, gardens, etc.); a key or legend 269 identifying visual indicators used for one or more types of information; etc. When displayed as part of a GUI, some or all such illustrated information may be user-selectable controls (or be associated with such controls) that allows an end-user to select and display some or all of the associated information (e.g., to select the 360° panorama image indicator for acquisition location 210B to view some or all of that panorama image (e.g., in a manner similar to that of FIGS. 2A-2H). In addition, in this example a user-selectable control 228 is added to indicate a current floor that is displayed for the floor plan, and to allow the end-user to select a different floor to be displayed—in some embodiments, a change in floors or other levels may also be made directly from the floor plan, such as via selection of a corresponding connecting passage in the illustrated floor plan (e.g., the stairs to floor 2). It will be appreciated that a variety of other types of information may be added in some embodiments, that some of the illustrated types of information may not be provided in some embodiments, and that visual indications of and user selections of linked and associated information may be displayed and selected in other manners in other embodiments.

In addition to the example floor plan 235*k*, FIG. 2K further illustrates information 205*k* corresponding to the panorama images generated for acquisition locations 210A-210J of example building 198, and in particular to creating a group of inter-connected linked panorama images for them, including relative position information that has been determined for the acquisition locations 210A-210J and their corresponding panorama images in a common global coordinate system or other common frame of reference. As discussed in greater detail elsewhere herein, relative positional information between two or more panorama images may be determined in various manners in various embodiments, including by analyzing metadata about the panorama acquisition and/or by analyzing the respective panorama images to determine common objects or features visible in multiple panorama images. It will be noted that, as the number of acquisition locations that are visible from each other increases, the precision of a location of a particular acquisition location may similarly increase, such as for embodiments in which the relative position information is determined based at least in part on matching corresponding objects or other features in the panorama images. In this example, the panorama image acquired at acquisition location 210D may be visible from only one other acquisition location (acquisition location 210C), such that some uncertainty may exist with respect to the position of acquisition location 210D (e.g., with the angle or direction between acquisition locations 210C and 210D known, but with the distance between acquisition locations 210C and 210D having increased uncertainty). In other embodiments, such as when linking information is used for determining the relative positions, and/or if other information about dimensions is available (e.g., from other building metadata that is available, from analysis of sizes of known objects in images, etc.), such uncertainty may be reduced or eliminated. In this case, while acquisition locations 210I and 210J are outside the building, the inter-connections to those acquisition locations 210I and 210J are nonetheless determined and included in the group of inter-connected linked panorama images. It will be appreciated that information about such a group of inter-connected linked panorama images may be displayed or otherwise presented in various manners, such as to present an image similar to that of information 205*k* and allow an end-user to select a displayed visual indication of an acquisition location to view the corresponding panorama image for that acquisition location, to select a starting one of the panorama images to initially display or otherwise present that includes visible links in directions to one or more other panorama images (e.g., in directions corresponding to the illustrated links 215) that an end-user may select to view the corresponding linked panorama image, etc.

Additional details related to embodiments of a system providing at least some such functionality of an MIGM system or related system for generating floor plans and associated information and/or presenting floor plans and associated information are included in U.S. Non-Provisional patent application Ser. No. 16/190,162, filed Nov. 14, 2018 and entitled "Automated Mapping Information Generation From Inter-Connected Images" (which includes disclosure of an example Floor Map Generation Manager, or FMGM, system that is generally directed to automated operations for generating and displaying a floor map or other floor plan of a building using images acquired in and around the building); in U.S. Non-Provisional patent application Ser. No. 16/681,787, filed Nov. 12, 2019 and entitled "Presenting Integrated Building Information Using Three-Dimensional Building Models" (which includes disclosure of an example FMGM system that is generally directed to automated operations for displaying a floor map or other floor plan of a building and associated information); in U.S. Non-Provisional patent application Ser. No. 16/841,581, filed Apr. 6, 2020 and entitled "Providing Simulated Lighting Information For Three-Dimensional Building Models" (which includes disclosure of an example FMGM system that is generally directed to automated operations for displaying a floor map or other floor plan of a building and associated information); in U.S. Non-Provisional patent application Ser. No. 17/080,604, filed Oct. 26, 2020 and entitled "Generating Floor Maps For Buildings From Automated Analysis Of Visual Data Of The Buildings' Interiors" (which includes disclosure of an example VTFM system that is generally directed to automated operations for generating a floor map or other floor plan of a building using visual data acquired in and around the building); and in U.S. Non-Provisional patent application Ser. No. 16/807,135, filed Mar. 2, 2020 and entitled "Automated Tools For Generating Mapping Information For Buildings" (which includes disclosure of an example MIGM system that is generally directed to automated operations for generating a floor map or other floor plan of a building using images acquired in and around the building); in U.S. Non-Provisional patent application Ser. No. 17/069,800, filed Oct. 13, 2020 and entitled "Automated Tools For Generating Building Mapping Information"; and in U.S. Non-Provisional patent application Ser. No. 17/013,323, filed Sep. 4, 2020 and entitled "Automated Analysis Of Image Contents To Determine The Acquisition Location Of The Image" (which includes disclosure of an example MIGM system that is generally directed to automated operations for generating a floor map or other floor plan of a building using images acquired in and around the building); each of which is incorporated herein by reference in its entirety. In addition, further details related to embodiments of a system providing at least some such functionality of a system for using acquired images and/or generated floor plans are included in U.S. Non-Provisional patent application Ser. No. 17/185,793, filed Feb. 25, 2021 and entitled "Automated Usability Assessment Of Buildings Using Visual Data Of Captured In-Room Images" (which includes disclosure of an example Building Usability Assessment Manager, or BUAM, system that is generally directed to automated operations for analyzing visual data from images captured in rooms of a building to assess room layout and other usability information for the building's rooms and optionally for the overall building, and to subsequently using the assessed usability information in one or more further automated manners); each of which is incorporated herein by reference in its entirety.

Various details have been provided with respect to FIGS. 2A-2K, but it will be appreciated that the provided details are non-exclusive examples included for illustrative purposes, and other embodiments may be performed in other manners without some or all such details.

Figure 3:
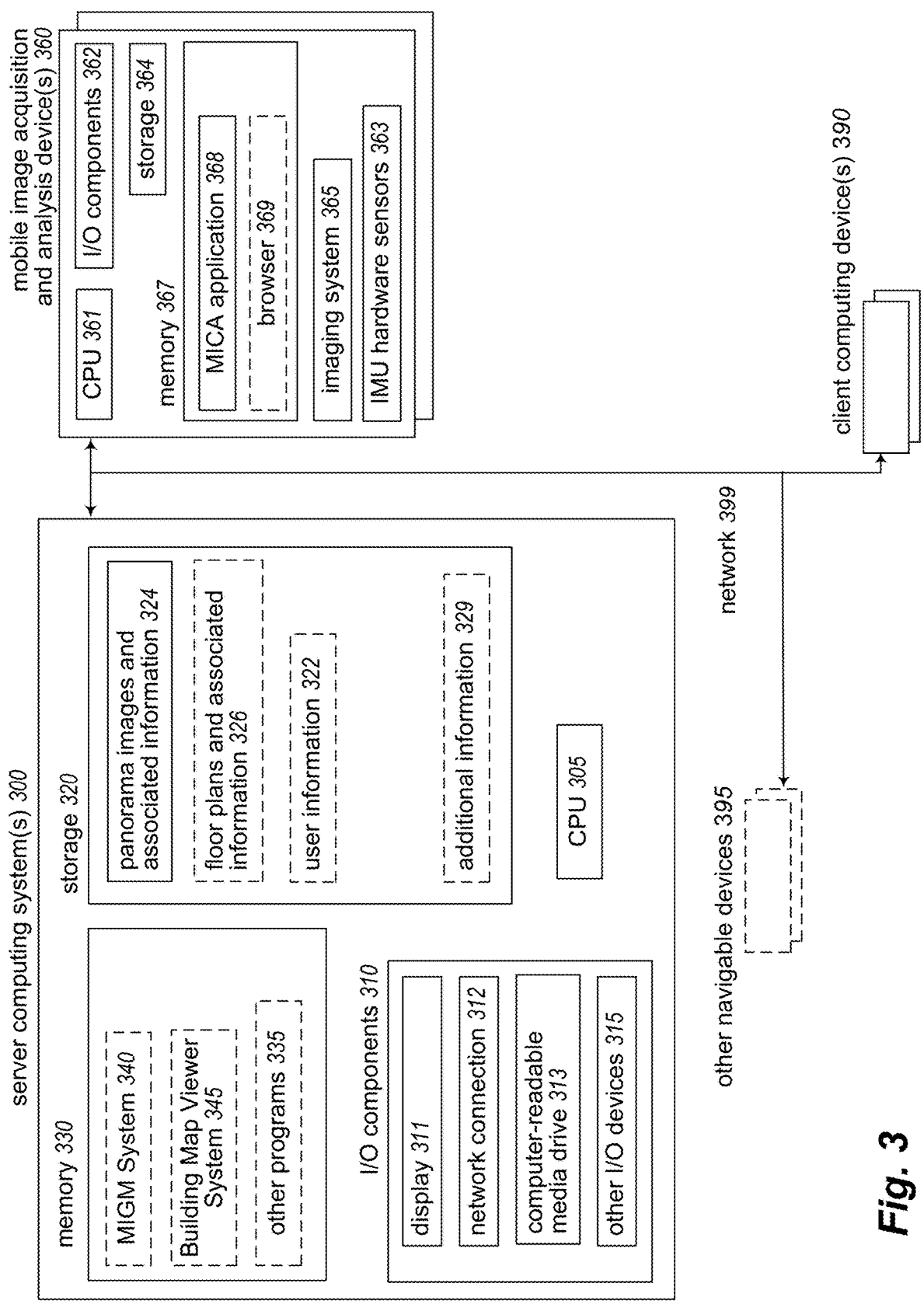
FIG. 3 is a block diagram illustrating a computing system suitable for executing an embodiment of a system that performs at least some of the techniques described in the present disclosure.

FIG. 3 is a block diagram illustrating an embodiment of one or more mobile image acquisition and analysis devices 360 that each executes an implementation of a MICA (Mobile Image Capture and Analysis) system 368 to generate panorama images at acquisition locations, of one or more server computing systems 300 that store and subsequently use the generated panorama images and associated information from the generation process, and of one or more client computing devices 390 and optionally other navigable devices 395 that obtain and use generated panorama images and/or further information produced using those generated panorama images in one or more manners. In the illustrated embodiment, the server computing systems 300 may optionally further execute one or more additional programs that use the generated panorama images in various manners, such as an optional MIGM system 340 and/or an optional Building Map Viewer system 345 and/or one or other optional programs 335, while one or more of the client computing devices 390 may similarly be executing an MIGM system (not shown) and/or a Building Map Viewer system (not shown), whether instead of or in addition to the server computing systems 300. The mobile device(s) and server computing system(s) and other computing systems and device, along with the MICA and/or MIGM and/or Building Map Viewer systems, may be implemented using a plurality of hardware components that form electronic circuits suitable for and configured to, when in combined operation, perform at least some of the techniques described herein.

In the illustrated embodiment, each server computing system 300 includes one or more hardware central processing units ("CPUs") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.). Each mobile device 360 may have similar components to that of a server computing system, including additional illustrated components (e.g., one or more imaging systems 365, one or more IMU hardware sensors 363, etc.), although only one or more hardware processors 361, I/O components 362, storage 364 and memory 367 are illustrated in this example, with the memory 367 executing the MICA application 368 and optionally a browser 369 or other program(s), and with the storage 364 storing various data (not shown). In addition, the other computing devices and systems 390 and 395 may each have similar hardware components and software modules, but particular such components and modules are not illustrated for the sake of brevity.

The mobile device(s) 360 and executing MICA application(s) 368, server computing system(s) 300 and executing MIGM and Building Map Viewer systems 340-345 (if any), and other computing systems and devices 390 and 395 may communicate with each other and with other computing systems and devices (not shown) in this illustrated embodiment, such as via one or more networks 399 (e.g., the Internet, one or more cellular telephone networks, etc.), including for the executing MICA application(s) to generate and supply panorama images, for the executing MIGM systems to use generated panorama images to generate and supply floor plans and other mapping-related information, for user client computing devices 390 to receive and present generated building information (e.g., generated panorama images, such as for a group of inter-connected linked panorama images; for a floor map or other mapping-related information; etc.; and optionally other associated images and/or other related information, such as by executing a copy of the Building Map Viewer system, not shown), for other navigable devices 395 to optionally receive and use floor maps and optionally other generated information for navigation purposes (e.g., for use by semi-autonomous or fully autonomous vehicles or other devices), etc. In other embodiments, some of the described functionality may be combined in less computing systems, such as to combine the MICA system 340 and the Building Map Viewer system 345 in a single system or device, to combine the MIGM system 340 and the MICA application of mobile device(s) 360 in a single system executed on the mobile device(s), to combine the MICA application 368 and the Building Map Viewer system in a single system executed on the mobile device(s), etc.

In the illustrated embodiment, an embodiment of the MICA application 368 executes in memory 367 of the mobile device(s) 360 in order to perform at least some of the described techniques, such as by using the processor(s) 361 to execute software instructions of the system 368 in a manner that configures the processor(s) 361 and mobile device 360 to perform automated operations that implement those described techniques. The illustrated embodiment of the MICA system may include one or more modules, not shown, to each perform portions of the functionality of the MICA application, and the memory may further optionally execute one or more other programs (e.g., a browser 369; a copy of the MIGM system and/or Building Map Viewer system, not shown, such as instead of or in addition to the systems 340-345 on the server computing system(s) 300; etc.). The MICA application 368 may further, during its operation, store and/or retrieve various types of data on storage 368 (e.g., in one or more databases and/or queues and/or caches and/or other data structures), as discussed in greater detail elsewhere herein. Similarly, the storage 320 on the server computing systems 300 may similarly store various information (e.g., in one or more databases or other data structures), such as generated panorama images and/or other associated information 324 received from one or more executing MICA applications, and optionally various types of user information 322, floor plans and other associated information 326 (e.g., generated and saved 2.5D and/or 3D models, generated and saved interconnected linked groups of panorama images, etc., along with additional information for use with such floor plans and/or interconnected linked panorama image groups, such as building and room dimensions, additional images, annotation information, etc.), and/or various types of optional additional information 329 (e.g., various analytical information related to presentation or other use of one or more building interiors or other environments).

It will also be appreciated that mobile devices 360 and computing systems 300 and the other systems and devices included within FIG. 3 are merely illustrative and are not intended to limit the scope of the present invention. The systems and/or devices may instead in some embodiments each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated MICA application 368 may in some embodiments be distributed in various modules, some of the described functionality of the MICA application 368 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software systems and/or modules may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the MICA application 38 executing on mobile device 368) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or modules may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
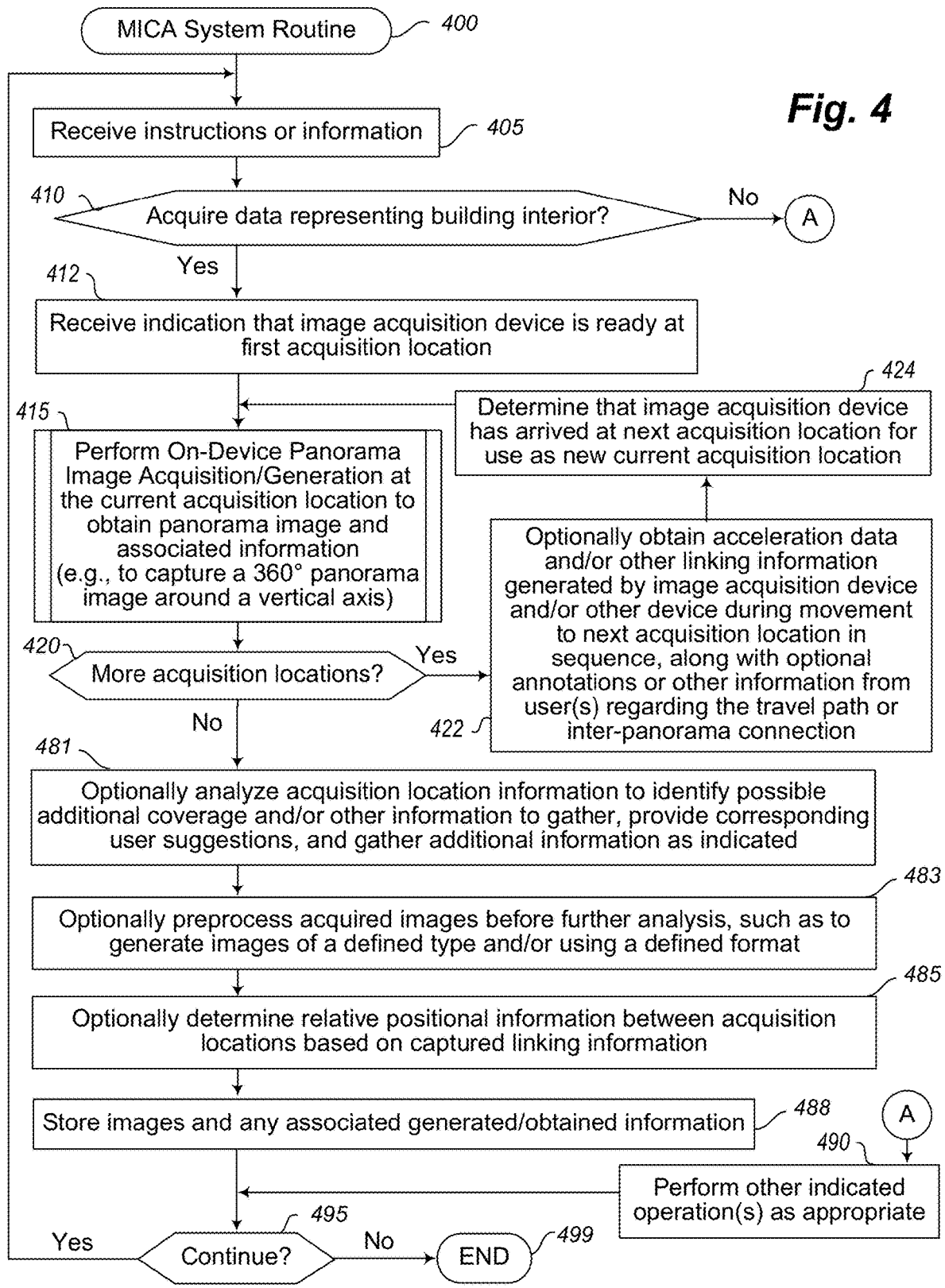
FIG. 4 illustrates an example embodiment of a flow diagram for a Mobile Image Capture and Analysis (MICA) system routine in accordance with an embodiment of the present disclosure.

FIG. 4 illustrates an example flow diagram of an embodiment of a MICA System routine 400. The routine may be performed by, for example, the MICA System 140 of FIG. 1A, the MICA application 368 of FIG. 3, and/or a MICA system as otherwise described herein, such as to generate 360° panorama images at acquisition locations within buildings or other structures using other constituent images acquired at those acquisition locations, such as with the panorama image generation being performed in part or in whole on a mobile device that captures the constituent images (e.g., a smart phone or tablet computer), and such as for use in subsequent generation of related floor plans and/or other mapping information. While portions of the example routine 400 are discussed with respect to acquiring particular types of images at particular acquisition locations in particular manners, it will be appreciated that this or a similar routine may be used to acquire video or other data (e.g., audio), whether instead of or in addition to such images. In addition, while the illustrated embodiment acquires and uses information from the interior of a target building, it will be appreciated that other embodiments may perform similar techniques for other types of data, including for non-building structures and/or for information external to one or more target buildings of interest. Furthermore, in some embodiments, some of the routine may be executed on a mobile device used by a user to acquire image information while other of the routine may be executed on one or more other computing devices (e.g., by a server computing system remote from such a mobile device and/or by one or more other computing devices at a location of the mobile device, such as in a distributed peer-to-peer manner using local inter-connections at that location).

The illustrated embodiment of the routine begins at block 405, where instructions or information are received. At block 410, the routine determines whether the received instructions or information indicate to acquire data representing a building interior, and if not continues to block 490. Otherwise, the routine proceeds to block 412 to receive an indication (e.g., from a user of a mobile image acquisition device) to begin the image acquisition process at a first acquisition location. After block 412, the routine proceeds to block 415 in order to perform a subroutine to generate, on a mobile device acquiring image information at the acquisition location in the interior of the target building of interest, a 360° panorama image for the acquisition location, such as to provide horizontal coverage of at least 360° around a vertical axis, and to receive the generated panorama image from the subroutine—such a subroutine may, for example, be performed by a processing module of the MICA system, with one example of such a subroutine being further described with respect to FIG. 5. The routine 400 may also optionally information in block 415 from the subroutine that includes annotation and/or other information from a user regarding the acquisition location and/or the surrounding environment for the generated panorama image, and/or obtain other such information from a user regarding the surrounding environment during movement between acquisition locations in block 422, such as for later use in presentation of information regarding the acquisition location(s) and/or surrounding environment.

After block 415 is completed, the routine continues to block 420 to determine if there are more acquisition locations at which to acquire images, such as based on corresponding information provided by the user of the mobile device. If so, the routine continues to block 422 to optionally initiate the capture of linking information (such as acceleration data) during movement of the mobile device along a travel path away from the current acquisition location and towards a next acquisition location within the building interior. As described elsewhere herein, the captured linking information may include additional sensor data recorded during such movement (e.g., from one or more IMU, or inertial measurement units, on the mobile device or otherwise carried by the user, and/or additional image or video information). Initiating the capture of such linking information may be performed in response to an explicit indication from a user of the mobile device or based on one or more automated analyses of information recorded from the mobile device. In addition, the routine may further optionally monitor the motion of the mobile device in some embodiments during movement to the next acquisition location, and provide one or more corrective guidance cues to the user regarding the motion of the mobile device, quality of the sensor data and/or video information being captured, associated lighting/environmental conditions, advisability of capturing a next acquisition location, and any other suitable aspects of capturing the linking information. Similarly, the routine may optionally obtain annotation and/or other information from the user regarding the travel path, such as for later use in presentation of information regarding that travel path or a resulting inter-panorama connection link. In block 424, the routine determines that the mobile device has arrived at the next acquisition location (e.g., based on an indication from the user, based on the forward movement of the user stopping for at least a predefined amount of time, etc.), for use as the new current acquisition location, and returns to block 415 in order to perform the acquisition location image acquisition activities for the new current acquisition location.

Figure 6A:
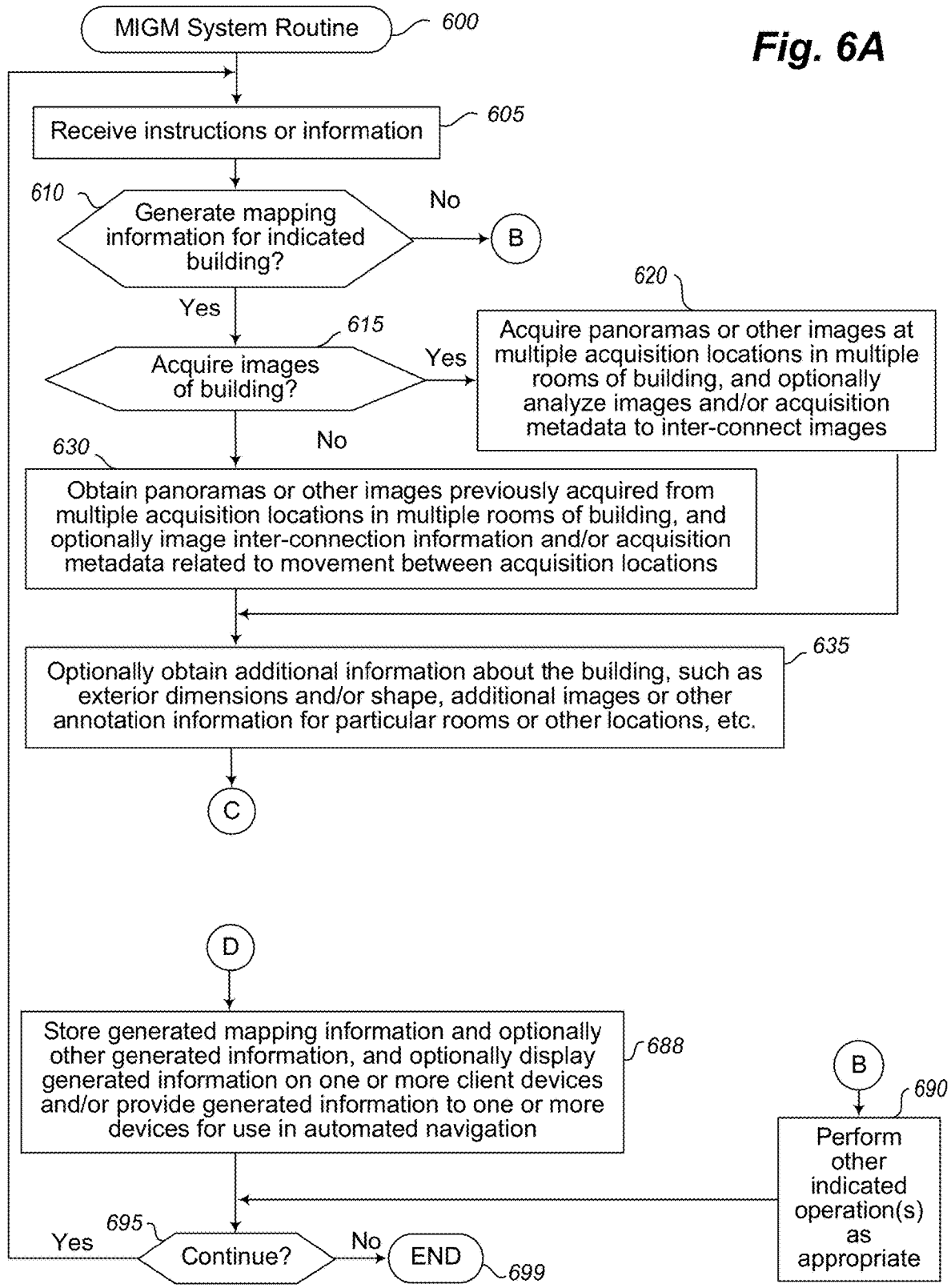

If it is instead determined in block 420 that there are not any more acquisition locations at which to acquire image information for the current building or other structure, the routine proceeds to block 481 to optionally analyze the acquisition location information for the building or other structure, such as to identify possible additional coverage (and/or other information) to acquire within the building interior. For example, the MICA system may provide one or more notifications to the user regarding the information acquired during capture of the multiple acquisition locations and optionally corresponding linking information, such as if it determines that one or more segments of the recorded information are of insufficient or undesirable quality, or do not appear to provide complete coverage of the building. After block 481, the routine continues to block 483 to optionally preprocess the acquired 360° panorama images before their subsequent use for generating related mapping information, such as to use a specific format and/or to be of a defined type that presents information in a specific manner (e.g., using a spherical format, using a perspective linear format, etc.). After block 483, the routine continues to block 485 to optionally determine the relative locations of the acquisition locations to each other, such as based on directions between pairs of acquisition locations that are determined from one or more of image analysis of the panorama images for those two acquisition locations to identify matching room features and/or of analysis of the captured linking information (whether between those two acquisition locations or between a sequence of multiple acquisition locations that includes those two acquisition locations)—additional details regarding such determination of inter-positional information for acquisition locations and generation of corresponding inter-panorama links are included elsewhere herein, as well as to optionally determine distance information that is then used to determine actual locations of and distances between acquisition locations. In block 488, the images and any associated generated or obtained information is stored for later use. FIGS. 6A-6B illustrate one example of a routine for generating a floor plan representation of a building interior from such generated panorama information.

If it is instead determined in block 410 that the instructions or other information recited in block 405 are not to acquire images and other data representing a building interior, the routine continues instead to block 490 to perform any other indicated operations as appropriate, such as any housekeeping tasks, to configure parameters to be used in various operations of the system (e.g., based at least in part on information specified by a user of the system, such as a user of a mobile device who captures one or more building interiors, an operator user of the MICA system, etc.), to respond to requests for generated and stored information (e.g., to identify one or more groups of inter-connected linked panorama images each representing a building or part of a building that match one or more specified search criteria, one or more panorama images that match one or more specified search criteria, etc.), to obtain and store other information about users of the system, etc.

Following blocks 488 or 490, the routine proceeds to block 495 to determine whether to continue, such as until an explicit indication to terminate is received, or instead only if an explicit indication to continue is received. If it is determined to continue, the routine returns to block 405 to await additional instructions or information, and if not proceeds to step 499 and ends.

Figure 5:
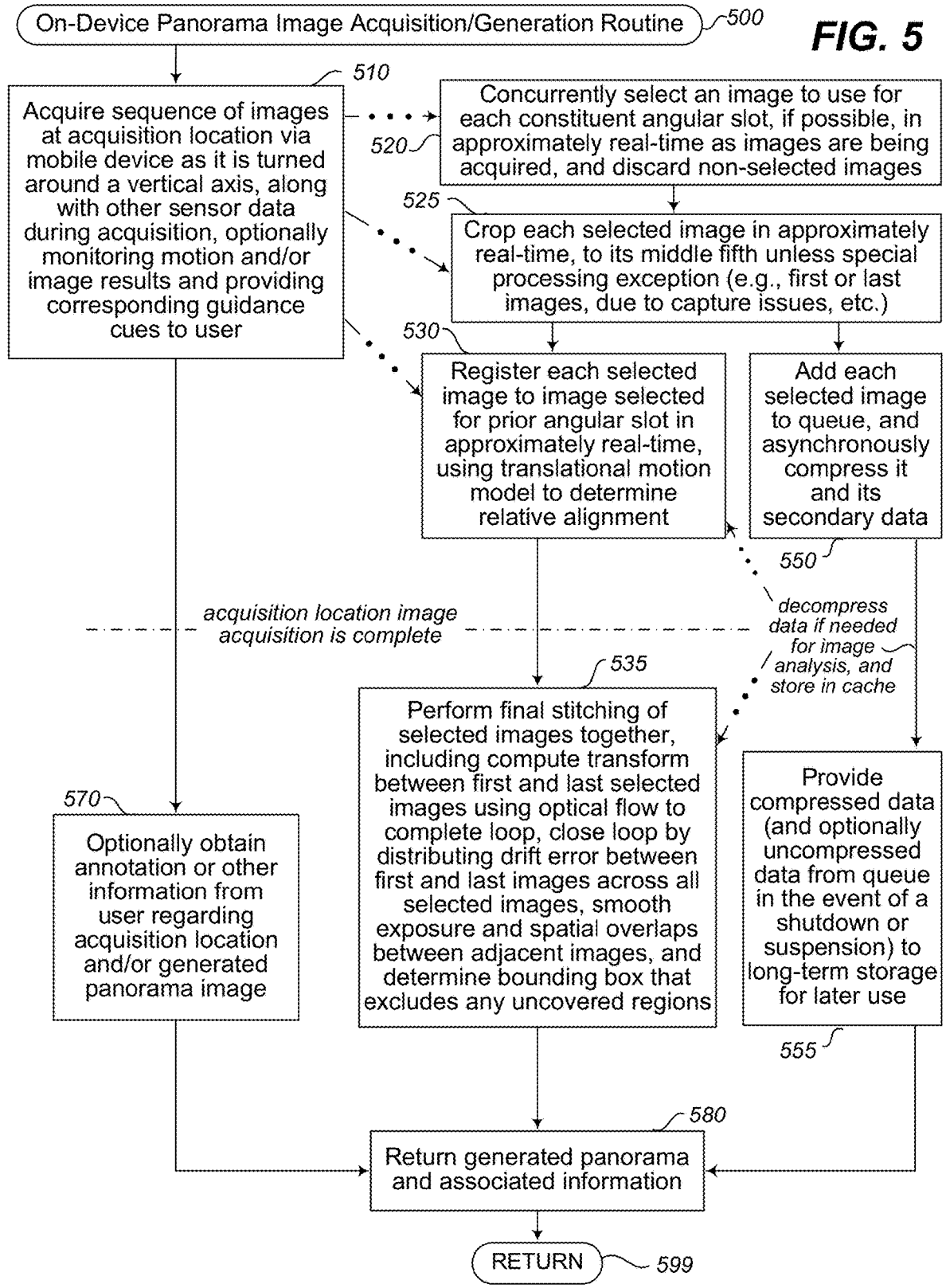
FIG. 5 illustrates an example embodiment of a flow diagram for an On-Device Panorama Image Acquisition/Generation module routine in accordance with an embodiment of the present disclosure.

FIG. 5 illustrates an example embodiment of a flow diagram for an On-Device Panorama Image Acquisition/Generation module routine 500. The routine may be performed by, for example, execution of one of the processing modules 145 of the MICA system 140 of FIG. 1A, by the MICA application 368 of FIG. 3, and/or a MICA system as described with respect to FIGS. 2A-2K and elsewhere herein, such as to perform automated operations on a mobile device (e.g., a smart phone) related to acquiring a sequence of constituent images in multiple directions from an acquisition location in a building (e.g., with 360 degrees of horizontal coverage), and combining some or all of the constituent images to generate a panorama image from the acquisition location, with some or all of the panorama image generation activities occurring concurrently with the acquisition of the constituent images and in a real-time or near-real-time manner. The routine 500 may be invoked in various manners in various embodiments and situations, including from block 415 of FIG. 4. In the example embodiment of FIG. 5, the building is a house, and a particular combination of operations are performed on the mobile device that also captures the images, but in other embodiments other operations may be used to generate panorama images for other types of structures or for non-structure locations and in other manners, including in some cases to have at least some of the operations be performed on one or more other devices (whether instead of or in addition to the mobile device that captures the images, and whether at a location local to the mobile device or instead remote from and separated from the location of the mobile device by one or more computer networks), as discussed elsewhere herein.

The illustrated embodiment of the routine begins at block 510, where the mobile device acquires a sequence of constituent images over a period of time at an acquisition location in a house as the mobile device is turned in a circle around a vertical axis (e.g., is held by a user who turns his or her body in a circle, is turned by a motor of the mobile device or of another device that holds or supports the mobile device, etc.)—the acquisition activities may include, for example, acquiring 60 images per second for a total of 540 angular slots around a 360° circle (each 0.67° of horizontal rotation) during a period of time of a few seconds. In at least some embodiments and situations, the constituent images acquired may be frames that the mobile device may additionally or alternatively use to generate a video, such as with each constituent image being a full HD image acquired at 1080p resolution (e.g., 1920 pixels by 1,080 pixels) or another resolution (e.g., 2K, 4K, etc.) and/or with each constituent image being an ultrawide image (e.g., with a horizontal coverage of approximately 105° to 120°) and with resolution at 1080p or at 2 times 1080p or at 4 times 1080p (e.g., 3840 pixels by 2160 pixels, 4920 pixels by 2800 pixels, etc.). In addition, the routine further acquires other sensor data from the mobile device during the acquisition of the constituent images, such as IMU data and optionally other data, and associates that other acquired sensor data with the corresponding one or more constituent images being concurrently captured, such as for later use in determining an amount of translation motion between image slices selected for adjacent angular slots.

In some embodiments and situations, the routine may further perform additional operations during the acquisition of the sequence of constituent images, including one or more of the following: monitoring motion of the mobile device and taking corrective actions if motion problems are identified (e.g., motion that is too fast or too slow, motion that is not smooth, motion that is not level, etc.), such as to provide corresponding corrective guidance cues to the user; monitoring results of constituent images that are captured and taking corrective actions if image content problems identified (e.g., an image that is out of focus, that is tilted or skewed, etc.), such as to provide corresponding corrective guidance cues to the user; etc. While not shown in the illustrated embodiment, in other embodiments additional operations may be performed as part of the acquisition of the sequence of constituent images, including to dynamically determine one or more parameters to use during the acquisition activities (e.g., to perform such dynamic determination for each constituent image or at the beginning of the acquisition process), such as to vary acquisition parameters based on computing resources of the mobile device (e.g., available RAM, processor speed, local storage, etc.) that include one or more of the following: the resolution of the constituent images, the total quantity of constituent images, the acquisition rate of constituent images, one of multiple available cameras or other imaging sensors to use for the acquisition (e.g., a default or ultrawide camera lens, a visible light sensor and/or infrared light sensor and/or ultraviolet light sensor, etc.), complementary functionality (e.g., to turn visible light on or off, to turn an infrared light on or off, to turn an ultraviolet light on or off, etc.), an amount of zoom to use during the acquisition, etc.

During the acquisition of the constituent images in block 510, the routine further performs an additional series of concurrent operations in blocks 520-530, such as in an approximately real-time manner (e.g., a real-time manner, with the operations of block 530 being completed at substantially the same time as those of block 510, such as within a defined quantity of milliseconds; or a near-real-time manner, with the operations of block 530 being completed at the same time as those of block 510 or within a small additional time period, such as a defined quantity of additional seconds or minutes).

In the illustrated embodiment, the concurrent operations include the routine in block 520 selecting a constituent image to use for each angular slot (e.g., each of 540 angular slots) if possible, and discarding any non-selected images—in some situations, the routine may have several candidate constituent images to choose for each angular slot that are acquired at a corresponding amount of angular rotation from a starting direction at the acquisition location (or within a defined amount of variation from that angular rotation amount), while in other situations the routine may have only a single candidate constituent image to use, and in yet other situations the routine may have no viable candidate constituent image to use (e.g., if there are no images acquired at all for the corresponding angular rotation, if corresponding images failed to satisfy one or more defined quality criteria, etc.) and may leave the angular slot empty if so. It will be appreciated that the quantity of angular slots to use may be varied in different situations, such as to use the same or less angular slots if ultrawide constituent images are acquired than if typical width constituent images are acquired.

After the routine has selected at least the first constituent image in block 520, the concurrent operations continue in block 525, where each image selected in block 520 is cropped unless special processing exceptions apply, with the default crop in the illustrated embodiment being to retain the middle fifth (20%) of the image in the horizontal direction, and all of the image in the vertical direction for that retained horizontal strip. Special processing exceptions apply for the first selected constituent image and the last selected constituent image, for which the entire images are retained in the illustrated embodiment. Other special processing exceptions may occur for selected constituent images between the first and last selected images if problems exist with the capture process and/or with the content of those constituent images, such as to retain more than the middle fifth of a selected constituent image in the horizontal direction if one or more immediately preceding angular slots do not have a selected constituent image, if the current selected constituent image reflects a situation in which the rotation occurred too quickly or had too much tilt/skew, if the current selected constituent image was acquired as part of a recapture activity to redo a capture at an angular direction for which a previous capture attempt had a problem, etc. It will be appreciated that the cropping may be varied in different situations, such as to use the same angular amount or percentage of horizontal crop if ultrawide constituent images are acquired while retaining additional vertical information available from the larger ultrawide constituent images.

After the routine has cropped at least the first selected constituent image in block 525, the routine further performs operation of block 550 to store each cropped image and associated secondary data (e.g., a frame buffer and optionally other metadata) to a queue, and to asynchronously retrieve the queued images and associated secondary data and compress them for later use. As some or all of the data is compressed in block 550, the routine provides that compressed data in block 555 to long-term storage (e.g., non-volatile storage on the mobile device and/or by transmitting the data a remote server for storage and later use), and in the event of a suspension or shutdown of the operations of the routine 500 before completion, optionally also handles the uncompressed data on the queue (if any) in the same manner, such as if blocks 510, 520 and 525 have completed in order to allow a later restart using that stored data without performing those blocks 510, 520 and 525 again during the restart.

In addition, after the routine has cropped at least the first selected constituent image in block 525, the concurrent operations also continue in block 530 where, starting with the second selected constituent image, each cropped image is registered and aligned with the previous cropped image (e.g., within a few milliseconds or seconds of receiving the captured constituent image, such as within 10 seconds or less), such as using translational motion analysis techniques to determine corresponding parts of the two cropped images. Special processing is performed for the first and last selected constituent images, as discussed further with respect to block 535. The operations of block 530 may occur concurrently with but asynchronously from those of block 550, and in at least some embodiments and situations, data that is compressed in block 550 may be subsequently decompressed if needed for the operations of block 530 and provided for use in those operations. In at least some such embodiments, a cache of decompressed data is further maintained, such that data used in block 530 will be provided from the cache if it is available there, and data that is newly decompressed will be added to the cache in accordance with defined cache replacement policies (with other previously existing decompressed data in the cache removed if appropriate in accordance with those cache replacement policies).

After the operations of block 530 have completed and the image acquisition activities of block 510 have completed (while the compression activities of block 550 may or may not have been completed), the routine in block 535 continues to perform final stitching activities to combine the selected, cropped and registered constituent images in order to generate a corresponding 360° panorama image. The final stitching activities include computing a transform between the first selected image and the last selected image, such as by using optical flow to identify corresponding features in those two images. In addition, the final stitching activities may further include closing the loop of constituent images by calculating drift error between those first and last images, and distributing that drift error across all of the selected constituent images. Additional activities performed during the final stitching activities may include smoothing the exposure between adjacent selected constituent images (e.g., by finding changes in intensity), smoothing spatial overlaps between adjacent selected constituent images (e.g., to reduce artifacts by blending adjacent constituent images), determining a bounding box for the combination of stitched constituent images that satisfies one or more defined criteria (e.g., the largest bounding box that excludes regions or areas not covered in the selected constituent images) and cropping the combination of stitched constituent images according to such a bounding box, etc. As with block 530, the operations of block 535 may, in at least some embodiments and situations, acquire and use decompressed data that was previously compressed in block 550, such as from the cache of decompressed data if it is maintained and otherwise by performing the decompression as needed (and with the cache maintained according to defined cache replacement policies). The results of the final stitching activities produce the panorama image generated for the acquisition location from the constituent images.

In addition, in the illustrated embodiment, the routine may further perform operations of block 570 to optionally obtain annotations or other information from a user of the mobile device regarding the acquisition location and/or the generated panorama image, such as for the acquisition location and/or the generated panorama image as a whole, and/or in particular directions (e.g., with the obtained annotations or other information to be associated with particular corresponding angular slots and constituent images in the generated panorama image). The obtained annotations or other information is those associated with the generated panorama image, such as for later use when presenting or otherwise analyzing information about the panorama image. In the illustrated embodiment, the activities of block 570 are performed after the image acquisition activities of block 510 have completed, but in other embodiments some or all of the activities of block 570 may be performed concurrently with those of block 510 (e.g., as a user holding the mobile device turns, by the user as the mobile device is rotated in an automated manner, etc.).

After blocks 535, 550 or 570, the routine continues to block 580 to return the panorama generated in block 535 and any associated information, including any information obtained in block 570. In addition, in at least embodiments, the routine further transmits compressed data in block 580 from block 550 to one or more server computing systems for storage and later use. After block 580, the routine continues to block 599 and returns.

It will be appreciated that the illustrated routine reflects an acquisition process of constituent images and generation process of a resulting panorama image that fully completes and returns corresponding information in block 580. In other embodiments, the routine may further support activities in which the acquisition process of constituent images in block 510 is completed and the concurrent processing steps of blocks 520 and 525 are completed, but in which the panorama image generation process of blocks 530 and/or 535 is suspended or stopped before completion and later restarted. In such operations, the steps of block 550 and 555 may be completed in part or in whole to compress data from the queue and to store it (along with data on the queue that is not yet compressed, if any) for later use during such a restart, such as by the mobile device (or other device) performing the restart activities retrieving that data from long-term storage on the mobile device and/or from a remote server system (e.g., data that was stored in block 555) and performing additional operations of blocks 530 and/or 535 as needed (and optionally of blocks 550 and 555 if additional uncompressed data remained on the queue at the time of suspension or stoppage, optionally of block 570 if not previously performed, etc.), followed by block 580.

FIGS. 6A-6B illustrate an example embodiment of a flow diagram for a Mapping Information Generation Manager (MIGM) System routine 600. The routine may be performed by, for example, execution of the MIGM system 160 of FIG. 1A, the MIGM system 340 of FIG. 3, and/or an MIGM system as described elsewhere herein, such as to generate a floor plan and optionally other mapping information (e.g., a 3D computer model) for a defined area based at least in part on images of the area. In the example of FIGS. 6A-6B, the generated mapping information includes a 2D floor plan and 3D computer model of a building, such as a house, but in other embodiments, other types of mapping information may be determined and generated for other types of buildings and used in other manners, as discussed elsewhere herein.

The illustrated embodiment of the routine begins at block 605, where information or instructions are received. The routine continues to block 610 to determine whether the instructions received in block 605 indicate to generate mapping information for an indicated building, and if so the routine continues to perform blocks 615-588 to do so, and otherwise continues to block 690.

In block 615, the routine determines whether image information is already available for the building, or if such information instead is to be acquired. If it is determined in block 615 that the information is to be acquired, the routine continues to block 620 to acquire such information, optionally waiting for one or more users or devices to move throughout the building and acquire panoramas or other images at multiple acquisition locations in multiple rooms of the building, and to optionally further analyze the images and/or metadata information about their acquisition to interconnect the images, as discussed in greater detail elsewhere herein—FIG. 4 provides one example embodiment of a MICA system routine for performing such image acquisition. If it is instead determined in block 615 that images of the building are already available, the routine continues instead to block 630 to obtain existing panoramas or other images from multiple acquisition locations in multiple rooms of the building, optionally along with interconnection information for the images and acquisition of metadata information related to movement between the acquisition locations, such as may in some situations have been supplied in block 605 along with the corresponding instructions.

After blocks 620 or 630, the routine continues to block 635 to optionally obtain additional information about the building (whether based on activities performed during initial image acquisition and/or afterwards), such as based on acquired annotation information and/or information from one or more external sources (e.g., online databases, information provided by one or more end-users, etc.) and/or information from analysis of acquired images (e.g., initial panorama images and/or additional images, such as for additional images captured at locations different from acquisition locations of the initial panorama images)—such additional obtained information may include, for example, exterior dimensions and/or shape of the building, information about built-in features (e.g., a kitchen island), information about installed fixtures and/or appliances (e.g., kitchen appliances, bathroom items, etc.); information about visual appearance information for building interior locations (e.g., color and/or material type and/or texture for installed items such as floor coverings or wall coverings or surface coverings), information about views from particular windows or other building locations, other information about areas external to the building (e.g., other associated buildings or structures, such as sheds, garages, pools, decks, patios, walkways, gardens, etc.; a type of an external space; items present in an external space; etc.).

After block 635, the routine continues to block 650 to determine, for each room inside the building with one or more acquisition locations and associated acquired images, a room shape of the room from data in the image(s) taken inside the room, and optionally a position within the room of its acquisition location(s), such as in an automated manner. In block 655, the routine further uses visual data in the images and/or the acquisition metadata for them to determine, for each room in the building, any connecting passages in or out of the room (e.g., doorways and other inter-room wall openings, such as in an automated manner). In block 660, the routine further uses visual data in the images and/or the acquisition metadata for them to determine, for each room in the building, any additional wall elements in the room and their positions other than doorways and other inter-room wall openings (e.g., in an automated manner), such as for windows, inter-wall borders, etc. It will be appreciated that while blocks 650-560 are illustrated as separate operations in this example, in some embodiments a single analysis of the images may be performed to acquire or determine multiple types of information, such as those discussed with respect to blocks 650-560.

In block 665, the routine then determines estimated positions of the room shapes to create an initial 2D floor plan, such as by connecting inter-room passages in their respective rooms, by optionally positioning room shapes around determined acquisition location positions (e.g., if the acquisition location positions are inter-connected), and by optionally applying one or more constraints or optimizations. Such a floor plan may include, for example, relative position and shape information for the various rooms without providing any actual dimension information for the individual rooms or building as a whole, and may further include multiple linked or associated sub-maps (e.g., to reflect different stories, levels, sections, etc.) of the building. The routine further associates positions of the doors, wall openings and other identified wall elements on the floor plan.

After block 665, the routine optionally performs one or more steps 675-680 to determine and associate additional information with the floor plan. In block 675, the routine optionally estimates the dimensions of some or all of the rooms, such as from analysis of images and/or their acquisition metadata or from overall dimension information obtained for the exterior of the building, and associates the estimated dimensions with the floor plan—it will be appreciated that if sufficiently detailed dimension information is available, architectural drawings, blue prints, etc. may be generated from the floor plan. After block 675, the routine continues to block 680 to optionally associate further information with the floor plan (e.g., with particular rooms or other locations within the building), such as additional images and/or additional types of other acquired information in the building and/or annotation information. In block 685, the routine further estimates heights of walls in some or all rooms, such as from analysis of images and optionally sizes of known objects in the images, as well as height information about a camera when the images were acquired, and further uses such information to generate a 3D computer model of the building, with the 3D model and the floor plan being associated with each other.

After block 685, the routine continues to block 688 to store the generated mapping information and optionally other generated information, and to optionally further use the generated mapping information, such as to provide the generated 2D floor plan and/or 3D computer model for display on one or more client devices, to provide that generated information to one or more other devices for use in automating navigation of those devices and/or associated vehicles or other entities, etc.

If it is instead determined in block 610 that the information or instructions received in block 605 are not to generate mapping information for an indicated building, the routine continues instead to block 690 to perform one or more other indicated operations as appropriate. Such other operations may include, for example, receiving and responding to requests for previously generated computer models and/or floor plans and/or other generated information (e.g., requests for such information for use by a MICA system; requests for such information for display on one or more client devices, such as for such information matching one or more specified search criteria; requests for such information to provide it to one or more other devices for use in automated navigation; etc.), obtaining and storing information about buildings for use in later operations (e.g., information about dimensions, numbers or types of rooms, total square footage, adjacent or nearby other buildings, adjacent or nearby vegetation, exterior images, etc.), etc.

After blocks 688 or 690, the routine continues to block 695 to determine whether to continue, such as until an explicit indication to terminate is received, or instead only if an explicit indication to continue is received. If it is determined to continue, the routine returns to block 605 to wait for and receive additional instructions or information, and otherwise continues to block 699 and ends.

Figure 7:
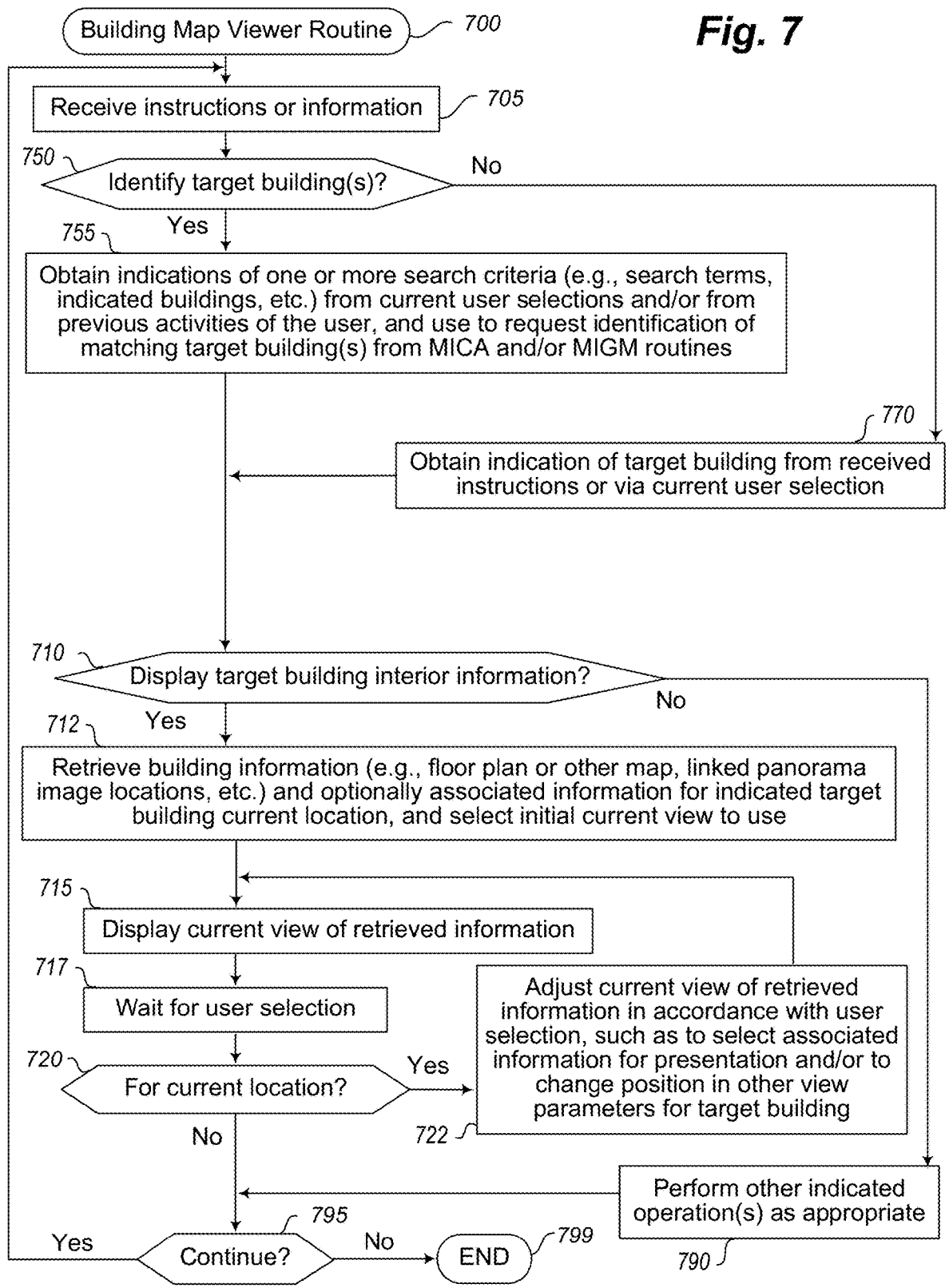
FIG. 7 illustrates an example embodiment of a flow diagram for a Building Map Viewer system routine in accordance with an embodiment of the present disclosure.

FIG. 7 illustrates an example embodiment of a flow diagram for a Building Map Viewer system routine 700. The routine may be performed by, for example, execution of a map viewer client computing device 175 and its software system(s) (not shown) of FIG. 1A, the Building Map Viewer system 345 and/or a client computing device 390 of FIG. 3, and/or a mapping information viewer or presentation system as described elsewhere herein, such as to select information for one or more buildings based on user-specific criteria (e.g., one or more building 2D floor plans and/or other related mapping information, such as a 3D computer model or a 2.5D computer model; one or more groups of inter-connected linked panorama images each representing some or all of a building; additional information associated with particular locations in the floor plan(s) or other mapping information, such as additional images and/or other types of data acquired in buildings; etc.), and to receive and display corresponding building information to an end-user. In the example of FIG. 7, the presented mapping information is for the interior of a building (such as a house), but in other embodiments, other types of mapping information may be presented for other types of buildings or environments and used in other manners, as discussed elsewhere herein.

The illustrated embodiment of the routine begins at block 705, where instructions or information are received. After block 705, the routine continues to block 750, where it determines whether the instructions or other information received in block 705 indicate to identify one or more target buildings whose information is to be presented based at least in part on user-specific criteria, and if not continues to block 770 to obtain an indication of a target building to use from the end-user (e.g., based on a current user selection, such as from a displayed list or other user selection mechanism; based on information received in block 705; etc.). Otherwise, the routine continues to block 755, where it obtains indications of one or more search criteria to use (e.g., one or more initial buildings to use for which to identify similar target buildings, such as from current user selections and/or from previous user selections or other previous user activities and/or as indicated in the information or instructions received in block 705; one or more explicit search terms; etc.). The routine then obtains information about one or more corresponding target buildings, such as by requesting the information from the MICA system and/or the MIGM system, and selects a best match target building to initially further use if information about multiple target buildings is returned (e.g., the returned other building with the highest similarity rating to one or more initial buildings or for one or more specified search criteria, or using another selection technique indicated in the instructions or other information received in block 705 or otherwise previously specified, such as a preference for the end-user). In some embodiments and situations, one or more target buildings may be selected based on both one or more other buildings and one or more specified criteria.

After blocks 755 or 770, the routine continues to block 710 to determine whether the instructions or other information received in block 705 are to display or otherwise present information about a target building (e.g., using a floor plan and/or a group of inter-connected linked panorama images that includes information about the interior of the target building), such as the best match target building from block 755 or other indicated target building in block 770, and if not continues to block 790. Otherwise, the routine proceeds to block 712 to retrieve the building information for the target building (optionally including indications of associated or linked information for the building interior and/or a surrounding location, such as with additional images taken within or around the building), and selects an initial view of the retrieved information (e.g., a view of the floor plan, of at least some of the 3D computer model, a panorama image from the group of inter-connected linked panorama images, etc.). In block 715, the routine then displays or otherwise presents the current view of the retrieved information, and waits in block 717 for a user selection. After a user selection in block 717, if it is determined in block 720 that the user selection corresponds to the current target building location (e.g., to change the current view of the displayed mapping information for that target building), the routine continues to block 722 to update the current view in accordance with the user selection, and then returns to block 715 to update the displayed or otherwise presented information accordingly. The user selection and corresponding updating of the current view may include, for example, displaying or otherwise presenting a piece of associated linked information that the user selects (e.g., a particular image associated with a displayed visual indication of a determined acquisition location), changing how the current view is displayed (e.g., zooming in or out; rotating information if appropriate; selecting a new portion of the floor plan and/or 3D computer model to be displayed or otherwise presented, such as with some or all of the new portion not being previously visible, or instead with the new portion being a subset of the previously visible information; selecting a different panorama image from a group of inter-connected linked panorama images to be displayed or otherwise presented, such as to display an initial subset view of that panorama image; etc.).

If it is instead determined in block 710 that the instructions or other information received in block 705 are not to present information representing a building interior, the routine continues instead to block 790 to perform any other indicated operations as appropriate, such as any housekeeping tasks, to configure parameters to be used in various operations of the system (e.g., based at least in part on information specified by a user of the system, such as a user of a mobile device who captures one or more building interiors, an operator user of the MICA system, etc.), to obtain and store other information about users of the routine (e.g., presentation and/or search preferences of a current user), to respond to requests for generated and stored information, etc.

Following block 790, or if it is determined in block 720 that the user selection does not correspond to the current target building location, the routine proceeds to block 795 to determine whether to continue, such as until an explicit indication to terminate is received, or instead only if an explicit indication to continue is received. If it is determined to continue (including in situations in which the user made a selection in block 717 related to a new target building location to present), the routine returns to block 705 to await additional instructions or information (or to continue on past block 705 and 750 to block 770 if the user made a selection in block 717 related to a new building location to present), and if not proceeds to step 799 and ends. In the illustrated embodiment, the routine in block 755 selects a best match target building to use if multiple target building candidates were returned to that block—in at least some embodiments, a queue of other such returned target buildings that are not first selected as best matches may further be saved and subsequently used (e.g., for the user to consecutively display or otherwise present information for multiple such other buildings), such as with the user selection in block 717 optionally indicating to select and use a next returned other building from such a queue.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
    recording, by a mobile computing device, data at an acquisition location inside a room of a multi-room building, including capturing, using at least one camera of the mobile computing device, constituent images in multiple directions from the acquisition location that aggregately provide 360 degrees of horizontal coverage from the acquisition location, and including obtaining data during the capturing from one or more inertial measurement unit (IMU) sensors of the mobile computing device;
    generating, by the mobile computing device, an initial version of a panorama image for the acquisition location, including:
        selecting, by the mobile computing device, a subset of the captured constituent images to use for generating the panorama image, wherein the selecting includes, for each of a sequence of a plurality of angular slots that each represents a distinct direction from the acquisition location and that aggregately cover 360 degrees horizontally from the acquisition location, associating one of the recorded constituent images with that angular slot, wherein the selecting of at least some of the captured constituent images of the subset occurs concurrently during the recording of the data, and wherein the selecting further includes discarding at least one of the captured constituent images that is not associated with any of the angular slots;
        modifying, by the mobile computing device, and for each of the selected constituent images of the subset other than a first constituent image selected for an initial angular slot of the sequence and a last constituent image selected for a last angular slot of the sequence, that selected constituent image to retain only a minority slice of that selected constituent image, and discarding portions of that selected constituent image that are not retained, wherein the modifying of at least some of the selected constituent images of the subset occurs concurrently during the recording of the data;

compressing, by the mobile computing device, the modified selected constituent images of the subset and storing the compressed images on non-volatile storage, wherein the compressing of at least some of the modified selected constituent images of the subset occurs concurrently during the recording of the data and asynchronously relative to the recording of the data; and combining, by the mobile computing device, the selected constituent images of the subset together in an order corresponding to the sequence of angular slots to form the initial version of the panorama image, including, for each of the modified constituent images, decompressing the compressed image for that modified constituent image and registering that decompressed modified constituent image to at least one other constituent image that is associated with an angular slot adjacent to another angular slot for which the modified constituent image is selected, by using translational motion and the obtained data from the one or more IMU sensors to align portions of the modified constituent image with portions of the at least one other constituent image, and wherein the combining of at least some of the selected constituent images of the subset occurs concurrently during the recording of the data and asynchronously relative to the recording of the data; and providing, by the mobile computing device, the generated panorama image for display on at least one client device.

2. The computer-implemented method of claim 1 further comprising creating, by the mobile computing device, a final version of the panorama image by, after the capturing of the constituent images, registering the first constituent image selected for the initial angular slot with the last constituent image selected for the last angular slot to close a loop of the selected constituent images, including matching features of the first and last constituent images and distributing drift error between the first and last constituent images across the selected constituent images of the subset, and performing a smoothing operation between at least some constituent images selected for adjacent angular slots in the sequence, wherein the smoothing operation includes at least one of modifying one or more of the at least some constituent images to reduce differences in pixel intensities between the at least some constituent images, or modifying one or more of the at least some constituent images to reduce spatial overlaps between the at least some constituent images using at least one of blending or feathering.

3. A non-transitory computer-readable medium having stored contents that cause a mobile device at an acquisition location associated with a building to perform automated operations including at least:

generating, by the mobile device, a panorama image for the acquisition location using constituent images captured in multiple directions from the acquisition location by at least one camera, including:

selecting, by the mobile device, and for each direction in a sequence of distinct directions from the acquisition location, one of the captured constituent images to use for that direction;

modifying, by the mobile device and while capturing of the constituent images is ongoing, each of at least some of the constituent images selected for the sequence to retain only a minority part of that selected constituent image;

compressing, by the mobile device and while capturing of the constituent images is ongoing, the modified constituent images, and storing the compressed images on non-volatile storage;

combining, by the mobile device, together in an order corresponding to the sequence of directions and while the capturing of the constituent images is ongoing, at least some of the constituent images selected for the sequence to form an initial version of the panorama image, including, for each of at least some of the modified constituent images, decompressing that modified constituent image and registering that decompressed modified constituent image to at least one other constituent image that is selected for an adjacent direction in the sequence, by using translational motion to align portions of that decompressed modified constituent image with portions of the at least one other constituent image; and performing, after capturing of the constituent images is completed, a smoothing operation in the initial version of the panorama image between at least some constituent images selected for adjacent directions in the sequence, wherein the smoothing operation includes at least one of modifying one or more of the at least some constituent images to reduce differences in pixel intensities between the at least some constituent images, or modifying one or more of the at least some constituent images to reduce spatial overlaps between the at least some constituent images using at least one of blending or feathering; and providing, by the mobile device, information about the building that includes the generated panorama image.

4. The non-transitory computer-readable medium of claim 3 wherein the smoothing operation includes the modifying of the one or more constituent images to reduce the differences in pixel intensities between the at least some constituent images, and further includes establishing one or more of the constituent images selected for the sequence as anchor images whose pixel intensities are fixed and are not changed in the smoothing operation.

5. The non-transitory computer-readable medium of claim 3 wherein the automated operations further include:

obtaining, for each of a sequence of a plurality of acquisition locations associated with the building, constituent images captured in multiple directions from that acquisition location, and performing the generating of the panorama image by the mobile device for each of the plurality of acquisition locations, wherein at least one of the plurality of acquisition locations is within an interior of the building;

recording, by the mobile device, linking information about movement of the mobile device along a travel path as the mobile device moves between successive acquisition locations in the sequence of acquisition locations; and generating, by the mobile device and based at least in part on the recorded linking information, relative positional information between at least some of the plurality of acquisition locations; and wherein the providing of the information by the mobile device includes providing, by the mobile device for display on one or more other devices, information about the building that includes one or more of the generated panorama images and that indicates at least some of the generated relative positional information.

6. The non-transitory computer-readable medium of claim 3 wherein the generating of the panorama image is performed without using any information from any depth-sensing sensors about a depth from the acquisition location to any surfaces of the building around the acquisition location.

7. A non-transitory computer-readable medium having stored contents that cause a mobile device at an acquisition location associated with a building to perform automated operations including at least:

generating, by the mobile device, a panorama image for the acquisition location using constituent images captured in multiple directions from the acquisition location by at least one camera, including:

selecting, by the mobile device, and for each direction in a sequence of distinct directions from the acquisition location, one of the captured constituent images to use for that direction, wherein the sequence of directions includes substantially 360 degrees horizontally from the acquisition location;

modifying, by the mobile device and while capturing of the constituent images is ongoing, each of at least some of the constituent images selected for the sequence to retain only a minority part of that selected constituent image;

combining, by the mobile device, in an order corresponding to the sequence of directions and while the capturing of the constituent images is ongoing, at least some of the constituent images selected for the sequence to form an initial version of the panorama image, including, for each of at least some of the modified constituent images, registering that modified constituent image to at least one other constituent image that is selected for an adjacent direction in the sequence, by using translational motion to align portions of that modified constituent image with portions of the at least one other constituent image; and after capturing of the constituent images is completed, closing a loop of the constituent images selected for the sequence of directions by registering a first constituent image selected for an initial direction in the sequence with a last constituent image selected for a final direction in the sequence, including matching features of the first and last constituent images; and providing, by the mobile device, information about the building that includes the generated panorama image.

8. The non-transitory computer-readable medium of claim 7 wherein the capturing of the constituent images is performed while the at least one camera rotates substantially horizontally for substantially 360 degrees, wherein the mobile device combines all constituent images selected for the sequence in the order corresponding to the sequence and further performs the closing of the loop, and wherein the generating of the panorama image further includes, by the mobile device, determining drift error between the first and last constituent images from the registering of the first constituent image with the last constituent image, and distributing the drift error across the constituent images selected for the sequence to create a final version of the panorama image.

9. The non-transitory computer-readable medium of claim 7 wherein the closing of the loop is performed by one or more additional computing devices remote from the acquisition location, and wherein the generating of the panorama image further includes, by the one or more additional computing devices, determining drift error between the first and last constituent images from the registering of the first constituent image with the last constituent image, and distributing the drift error across the constituent images selected for the sequence to create a final version of the panorama image.

10. A non-transitory computer-readable medium having stored contents that cause a mobile device at an acquisition location associated with a building to perform automated operations including at least:

generating, by the mobile device, a panorama image for the acquisition location using constituent images captured in multiple directions from the acquisition location by at least one camera, wherein the acquisition location is in an interior of a room of the building, including:

selecting, by the mobile device, and for each direction in a sequence of distinct directions from the acquisition location, one of the captured constituent images to use for that direction;

modifying, by the mobile device and while capturing of the constituent images is ongoing, each of at least some of the constituent images selected for the sequence to retain only a minority part of that selected constituent image;

combining, by the mobile device, in an order corresponding to the sequence of directions and while the capturing of the constituent images is ongoing, at least some of the constituent images selected for the sequence to form an initial version of the panorama image, including, for each of at least some of the modified constituent images, registering that modified constituent image to at least one other constituent image that is selected for an adjacent direction in the sequence, by using translational motion to align portions of that modified constituent image with portions of the at least one other constituent image; and performing, by the mobile device and after capturing of the constituent images is completed, a cropping operation to remove portions of the constituent images selected for the sequence from the generated panorama image that do not include visual coverage of the room; and providing, by the mobile device, information about the building that includes the generated panorama image.

11. A non-transitory computer-readable medium having stored contents that cause a mobile device at an acquisition location associated with a building to perform automated operations, wherein the mobile device is a mobile computing device that includes the at least one camera and that includes one or more processors, and wherein the automated operations include at least:

generating, by the mobile device, a panorama image for the acquisition location using constituent images captured in multiple directions from the acquisition location by at least one camera, including:

selecting, by the mobile device, and for each direction in a sequence of distinct directions from the acquisition location, one of the captured constituent images to use for that direction, wherein the sequence of directions corresponds to a sequence of angular slots from the acquisition location that each differs from an adjacent angular slot in the sequence of angular slots by a defined angular amount, wherein the constituent images selected for the sequence are a subset of the captured constituent images, and wherein the selecting of one of the captured constituent images for one of the directions that corresponds to one of the angular slots includes identifying two or more constituent images captured since a prior angular slot in the sequence and using one or more defined criteria to select one of the identified two or more constituent images for the one direction and discarding at least one other image of the identified two or more constituent images for the one direction that is not the selected one constituent image;

modifying, by the mobile device and while capturing of the constituent images is ongoing, each of at least some of the constituent images selected for the sequence to retain only a minority part of that selected constituent image; and combining, by the mobile device, in an order corresponding to the sequence of directions and while the capturing of the constituent images is ongoing, at least some of the constituent images selected for the sequence to form an initial version of the panorama image, including, for each of at least some of the modified constituent images, registering that modified constituent image to at least one other constituent image that is selected for an adjacent direction in the sequence, by using translational motion to align portions of that modified constituent image with portions of the at least one other constituent image; and providing, by the mobile device, information about the building that includes the generated panorama image.

12. A non-transitory computer-readable medium having stored contents that cause a mobile device at an acquisition location associated with a building to perform automated operations, wherein the mobile device includes the at least one camera and further includes one or more inertial measurement unit (IMU) sensors, and wherein the automated operations include at least:

generating, by the mobile device, a panorama image for the acquisition location using constituent images captured in multiple directions from the acquisition location by at least one camera, including:

capturing, by the mobile device, the constituent images in the multiple directions and data from the IMU sensors during the capturing of the constituent images;

selecting, by the mobile device, and for each direction in a sequence of distinct directions from the acquisition location, one of the captured constituent images to use for that direction;

modifying, by the mobile device and while capturing of the constituent images is ongoing, each of at least some of the constituent images selected for the sequence to retain only a minority part of that selected constituent image; and combining, by the mobile device, in an order corresponding to the sequence of directions and while the capturing of the constituent images is ongoing, at least some of the constituent images selected for the sequence to form an initial version of the panorama image, including, for each of at least some of the modified constituent images, registering that modified constituent image to at least one other constituent image that is selected for an adjacent direction in the sequence, by using translational motion to align portions of that modified constituent image with portions of the at least one other constituent image, wherein the registering of each of the at least some modified constituent images to at least one other constituent image selected for an adjacent direction in the sequence is further based in part on the captured data from the IMU sensors; and providing, by the mobile device, information about the building that includes the generated panorama image.

13. A system comprising:

one or more hardware processors of a mobile computing device at an acquisition location associated with a building and associated with at least one camera; and one or more memories of the mobile computing device having stored instructions that, when executed by at least one of the one or more hardware processors, cause the mobile computing device to perform automated operations including at least:

obtaining constituent images captured in multiple directions from the acquisition location using the at least one camera;

while capturing of the constituent images is ongoing, performing at least some generation of a panorama image for the acquisition location, including:

determining a subset of the captured constituent images to use for the panorama image, including selecting some of the captured constituent images to associate with respective directions in a sequence of directions from the acquisition location, wherein the sequence of directions corresponds to a sequence of angular slots in different directions from the acquisition location that each differs from an adjacent angular slot in the sequence of angular slots by a determined angular amount, and wherein the selecting of one of the captured constituent images to associate with one of the directions that corresponds to one of the angular slots includes identifying two or more constituent images captured since a prior angular slot in the sequence and using one or more defined criteria to select one of the identified two or more constituent images for the one direction;

modifying each of at least some of the captured constituent images of the determined subset to retain only a minority part of that captured constituent image; and combining together at least some of the captured constituent images of the determined subset in an order corresponding to the sequence of directions to form an initial version of the panorama image, including, for each of at least some of the modified constituent images, registering that modified constituent image to at least one other constituent image that is selected for a direction adjacent in the sequence to an associated direction in the sequence for which the modified constituent image is selected, by using translational motion to align portions of that modified constituent image with portions of the at least one other constituent image; and providing information about the building that includes the initial version of the panorama image.

14. The system of claim 13 wherein the one or more mobile devices include multiple mobile devices that each performs a portion of the automated operations, to cause the at least some generation of the panorama image to be performed by the multiple mobile devices in a distributed manner.

15. The system of claim 13 wherein the stored instructions include software instructions that, when executed by the mobile computing device, cause the mobile computing device to perform further automated operations including pausing, after capturing of the constituent images is completed and before the generating of the panorama image is completed, the generation of the panorama image, and resuming the generation of the panorama image at a later time, including retrieving and decompressing one or more stored compressed copies of one or more of the captured constituent images for use in the resuming.

16. The system of claim 15 wherein the automated operations further include temporarily storing the modified at least some constituent images in a queue to enable performing compressing of the one or more constituent images and the combining in an asynchronous manner relative to capturing of the constituent images, and determining computing resources available on the mobile computing device, and wherein at least one of the compressing of the one or more constituent images or of use of the queue is performed in a manner based at least in part on the determined computing resources.

17. The system of claim 13 wherein the automated operations further include determining computing resources available on the mobile computing device, and determining a resolution to use for the constituent images based at least in part on the determined computing resources, and wherein the obtaining of the constituent images includes using the determined resolution.

18. The system of claim 13 wherein the angular slots each differs from an adjacent angular slot in the sequence of angular slots by a constant angular amount, and wherein the automated operations further include determining computing resources available on the mobile computing device, and determining the constant angular amount based at least in part on the determined computing resources, and wherein the selecting of some of the captured constituent images for the sequence is based in part on the determined constant angular amount.

19. The system of claim 13 wherein the automated operations further include determining computing resources available on the mobile computing device, determining one or more characteristics for a cache to hold decompressed constituent images based at least in part on the determined computing resources, and maintaining the cache of decompressed constituent images after the modifying based on the determined one or more characteristics, and wherein registering of modified constituent images with at least one other constituent images uses decompressed constituent images in the cache if available.

20. The system of claim 13 wherein, for one of the at least some constituent images that is selected for one of the directions of the sequence, the modifying of the one constituent image includes determining and using a quantity to retain of the one constituent image based on information specific to the one constituent image, the information specific to the one constituent image including at least one of an adjacent direction to the one direction not having a selected constituent image or a discontinuity occurring during capturing of the one constituent image relative to at least one other proximate constituent image, and wherein all of a first constituent image selected for an initial direction in the sequence is retained for use in the combining.

21. The system of claim 13 wherein the automated operations further include:
   obtaining, for each of a sequence of a plurality of acquisition locations associated with the building, constituent images captured in multiple directions from that acquisition location, and performing the generating of the panorama image for each of the plurality of acquisition locations, wherein at least one of the plurality of acquisition locations is within an interior of the building;
   recording, by the mobile computing device, linking information about movement of the mobile computing device along a travel path as the mobile computing device moves between successive acquisition locations in the sequence of acquisition locations; and
   generating, by the mobile computing device and based at least in part on the recorded linking information, relative positional information between at least some of the plurality of acquisition locations; and
   wherein the providing of the information by the mobile computing device includes providing, by the mobile computing device for display on one or more other devices, information about the building that includes one or more of the generated panorama images and that indicates at least some of the generated relative positional information.

22. The system of claim 13 wherein the generation of the panorama image is performed without using any information from any depth-sensing sensors about a depth from the acquisition location to any surfaces of the building around the acquisition location.

23. A computer-implemented method comprising:
   recording, by a mobile computing device, data at an acquisition location associated with a building, including recording constituent images in multiple directions from the acquisition location using at least one camera of the mobile computing device;
   generating, by the mobile computing device and contemporaneously with the recording of the data, an initial version of a panorama image for the acquisition location, including:
      selecting, by the mobile computing device, a subset of the recorded constituent images to use for generating the panorama image for the acquisition location, wherein the selecting includes, for each of a sequence of a plurality of angular slots that each represents a distinct direction from the acquisition location, associating one of the recorded constituent images with the angular slot, and wherein the selecting further includes discarding at least one of the recorded constituent images that is not associated with any of the angular slots;
      modifying, by the mobile computing device, and for each of at least some of the selected constituent images of the subset, that selected constituent image to retain only a minority slice of that selected constituent image, and discarding portions of that selected constituent image that are not retained; and
      combining, by the mobile computing device, the selected constituent images of the subset in an order corresponding to the sequence of angular slots to form the initial version of the panorama image, including, for each of the modified constituent images, registering that modified constituent image to at least one other constituent image that is associated with an angular slot adjacent to another angular slot with which the modified constituent image is associated, by using translational motion to align portions of that modified constituent image with portions of the at least one other constituent image; and providing, by the mobile computing device, the generated panorama image for display on at least one client device.

24. The computer-implemented method of claim 23 wherein the directions represented by the plurality of angular slots include substantially 360 degrees horizontally from the acquisition location, and wherein the method further comprises creating, after the recording of the constituent images, a final version of the panorama image, including registering a first constituent image selected for an initial angular slot of the sequence with a last constituent image selected for a last angular slot of the sequence to close a loop of the selected constituent images by matching features of the first and last constituent images, and further including distributing drift error between the first and last constituent images across the selected constituent images.

25. The computer-implemented method of claim 23 wherein the generating of the initial version of the panorama image by the mobile computing device further includes performing, by the mobile computing device, at least one of a corrective operation on one or more of the selected constituent images in the initial version of the panorama image, or a smoothing operation in the initial version of the panorama image on constituent images selected in adjacent angular slots.

* * * * *